(12) United States Patent
Shobatake

(10) Patent No.: US 8,880,098 B2
(45) Date of Patent: Nov. 4, 2014

(54) COMMUNICATION SERVER AND SESSION CONTROL METHOD

(75) Inventor: Yasuro Shobatake, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/224,457

(22) Filed: Sep. 2, 2011

(65) Prior Publication Data

US 2012/0064887 A1 Mar. 15, 2012

Related U.S. Application Data

(63) Continuation of application No. PCT/JP2009/069503, filed on Nov. 17, 2009.

(30) Foreign Application Priority Data

Mar. 3, 2009 (JP) ................................. 2009-049370

(51) Int. Cl.
| | |
|---|---|
| *H04W 24/00* | (2009.01) |
| *H04L 12/28* | (2006.01) |
| *H04N 7/173* | (2011.01) |
| *H04N 21/436* | (2011.01) |

(52) U.S. Cl.
CPC ........ *H04N 7/17318* (2013.01); *H04L 12/2812* (2013.01); *H04L 12/2838* (2013.01); *H04L 12/282* (2013.01); *H04N 21/43615* (2013.01); *H04L 2012/2849* (2013.01)
USPC .................. 455/456.3; 455/404.2; 455/414.1; 455/414.2; 455/414.3; 725/105; 725/113; 725/114; 725/86; 709/231; 709/246

(58) Field of Classification Search
USPC .......... 455/456.1–456.6, 404.2, 414.1–414.3, 455/418, 419; 725/105, 113–114, 135–153, 725/86–94; 709/231, 246
See application file for complete search history.

(56) References Cited

U.S. PATENT DOCUMENTS

| | | | | |
|---|---|---|---|---|
| 8,060,655 | B1 * | 11/2011 | Winebrenner et al. | 709/249 |
| 2005/0246746 | A1 * | 11/2005 | Yui et al. | 725/80 |
| 2007/0250845 | A1 * | 10/2007 | Walter et al. | 725/10 |

FOREIGN PATENT DOCUMENTS

| | | |
|---|---|---|
| JP | 3818646 | 6/2006 |
| JP | 2008-11050 A | 1/2008 |

(Continued)

OTHER PUBLICATIONS

International Search Report and Written Opinion dated Dec. 22, 2009 from PCT/JP2009/069503.
Kazutaka, et al., *A Programing Support Framework for Dynamic Process Deployment in Ubiquitous Environment (Mobile Applications, Special Issue) Mobile Communications and Intelligent Transportation Systems towards the Ubiquitous Era)*, Transactions of Information Processing Society of Japan, vol. 47, No. 12, Nov. 24 2008, pp. 3188-3202.

(Continued)

*Primary Examiner* — Wayne Cai
(74) *Attorney, Agent, or Firm* — Ohlandt, Greeley, Ruggiero & Perle, L.L.P.

(57) ABSTRACT

According to one embodiment, a communication server is provided with a communication interface unit, a storage unit, a setting unit and a roaming unit. The storage unit stores terminal list containing terminal ID and position ID (pID) of a content output terminal on a network. The setting unit transmits an instruction to set a session for outputting a content on the terminal, upon receiving from the terminal a first message containing user ID (uID), user position ID (upID) and content information associated with the session. The roaming unit selects, when a second message containing the uID and the upID is received, and it is determined that the user moved, a terminal having a pID corresponding to the upID, and transmits, to devices associated with session roaming to the selected terminal, an instruction to perform the session roaming.

9 Claims, 24 Drawing Sheets

(56) References Cited

FOREIGN PATENT DOCUMENTS

| JP | 200-35533 | 2/2008 |
|---|---|---|
| JP | 2008-85936 | 4/2008 |
| JP | 2008-97625 | 4/2008 |
| JP | 2009-20760 | 1/2009 |
| JP | 2009-31886 | 12/2009 |

OTHER PUBLICATIONS

Office Action dated May 15, 2012 from corresponding JP 2009-049370.

* cited by examiner

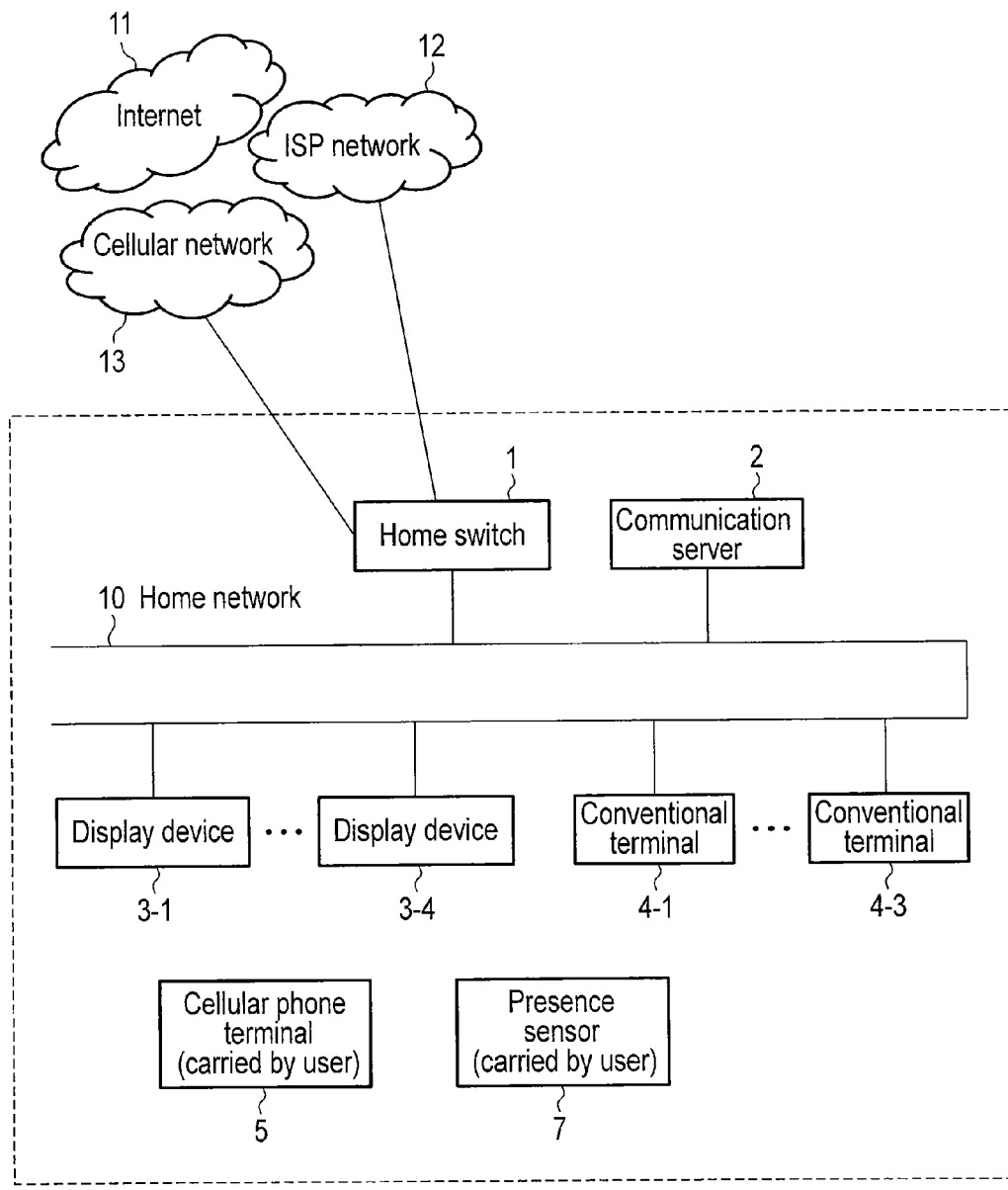
F I G. 1

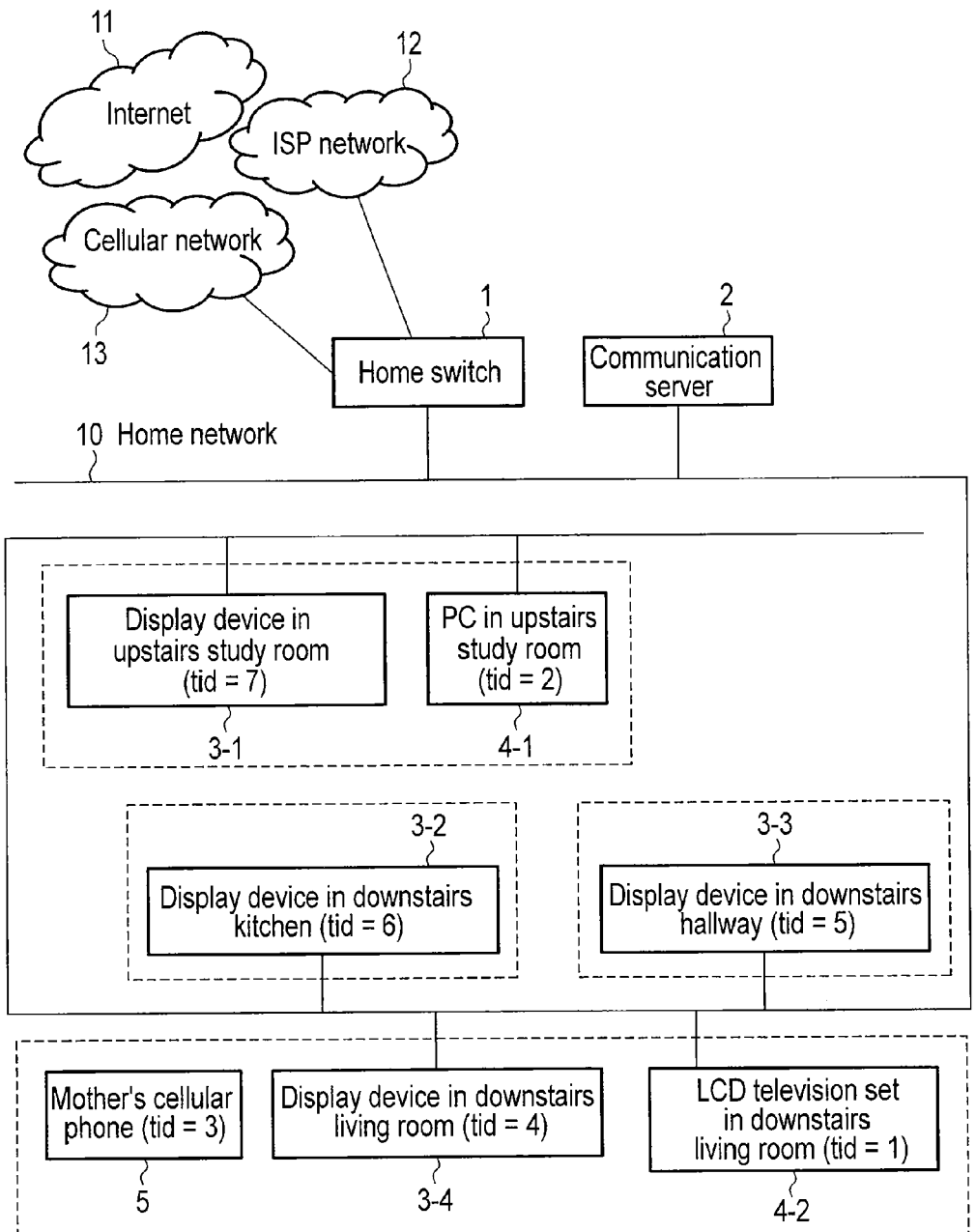
F I G. 2

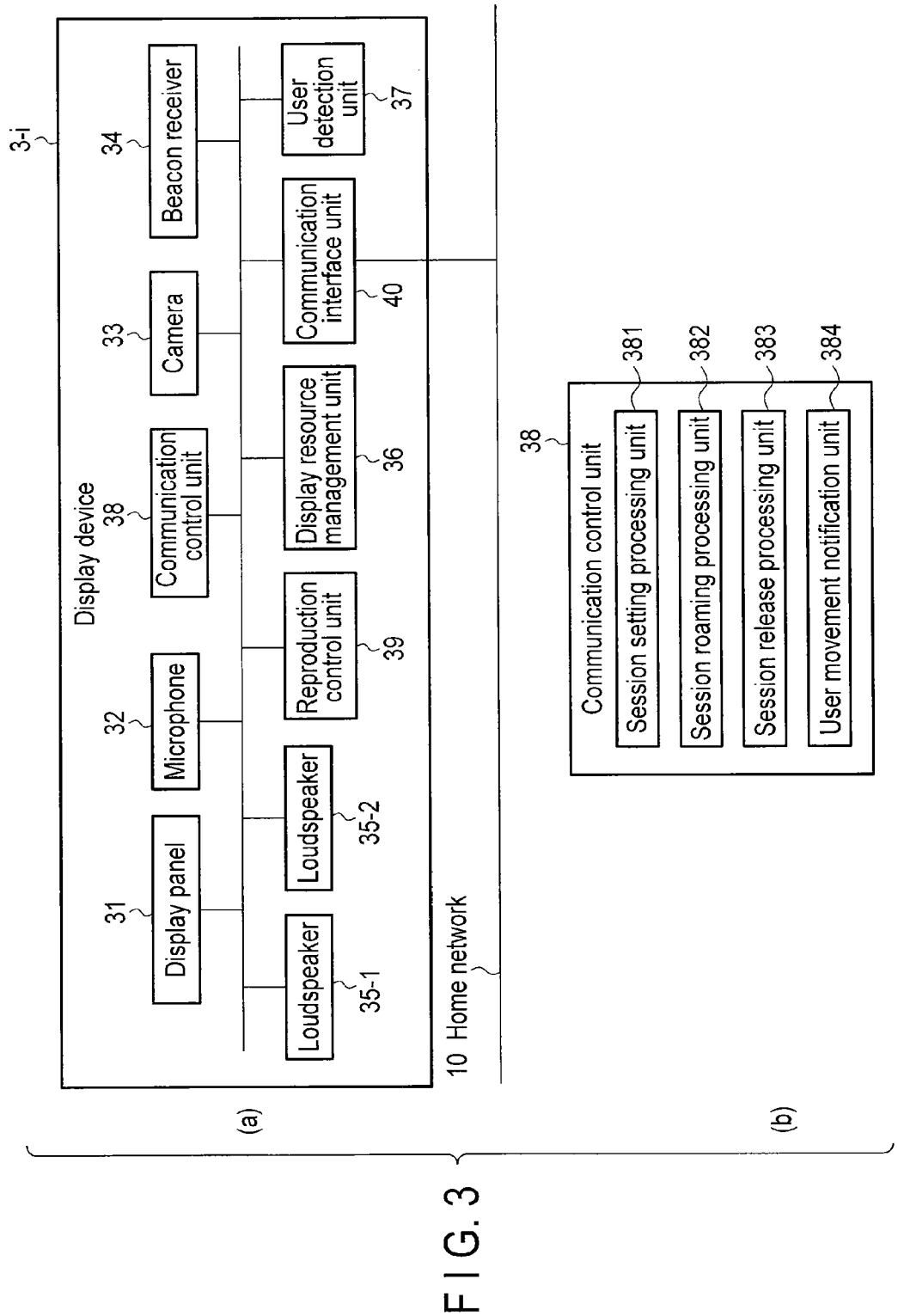
F I G. 3

| User ID | Content attributes | Terminal resource usage |
|---|---|---|
| | | |

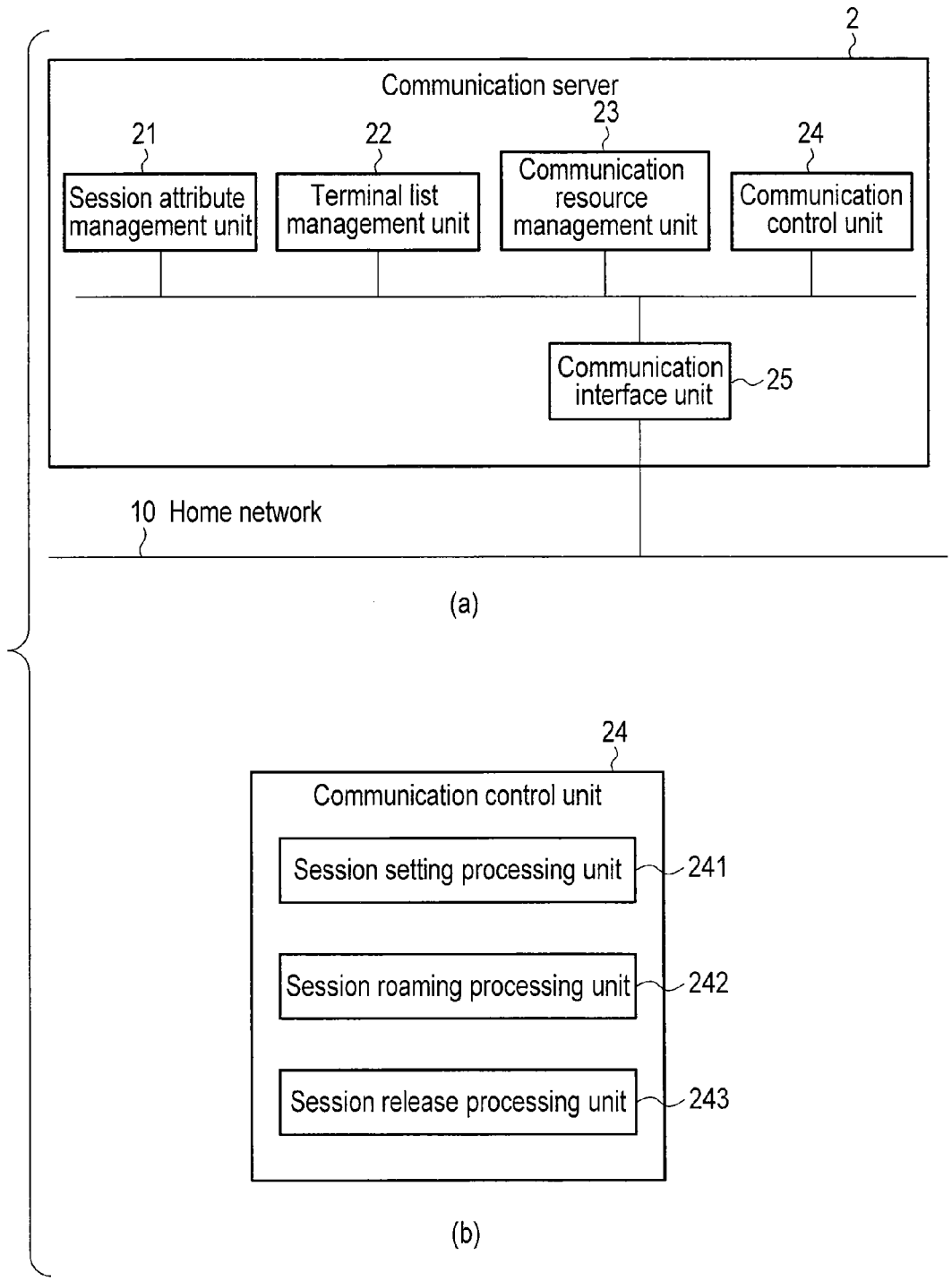
F I G. 6

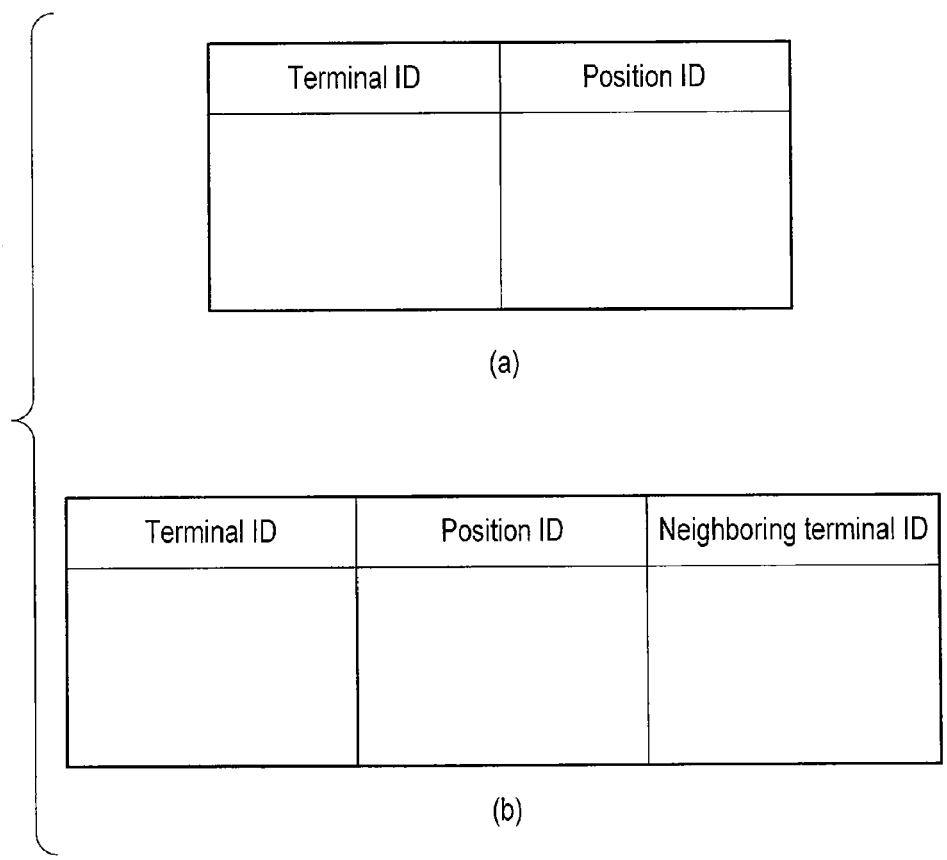
| Session ID | User attributes (user ID, position ID) | Content attributes | Terminal ID |
|---|---|---|---|
|  |  |  |  |
F I G. 7
| Terminal ID | Position ID |
|---|---|
|  |  |
(a)
| Terminal ID | Position ID | Neighboring terminal ID |
|---|---|---|
|  |  |  |
(b)
F I G. 8

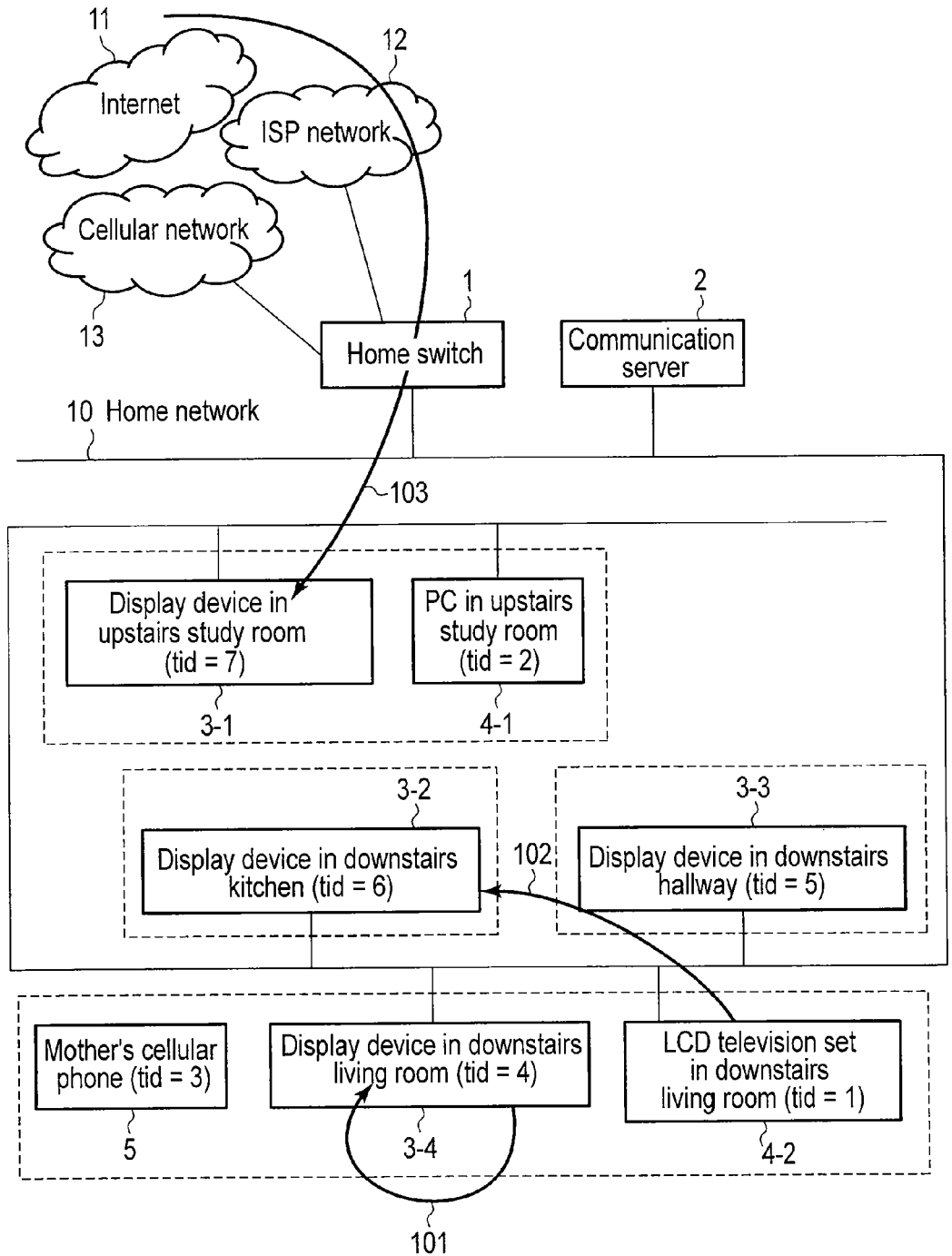
F I G. 11

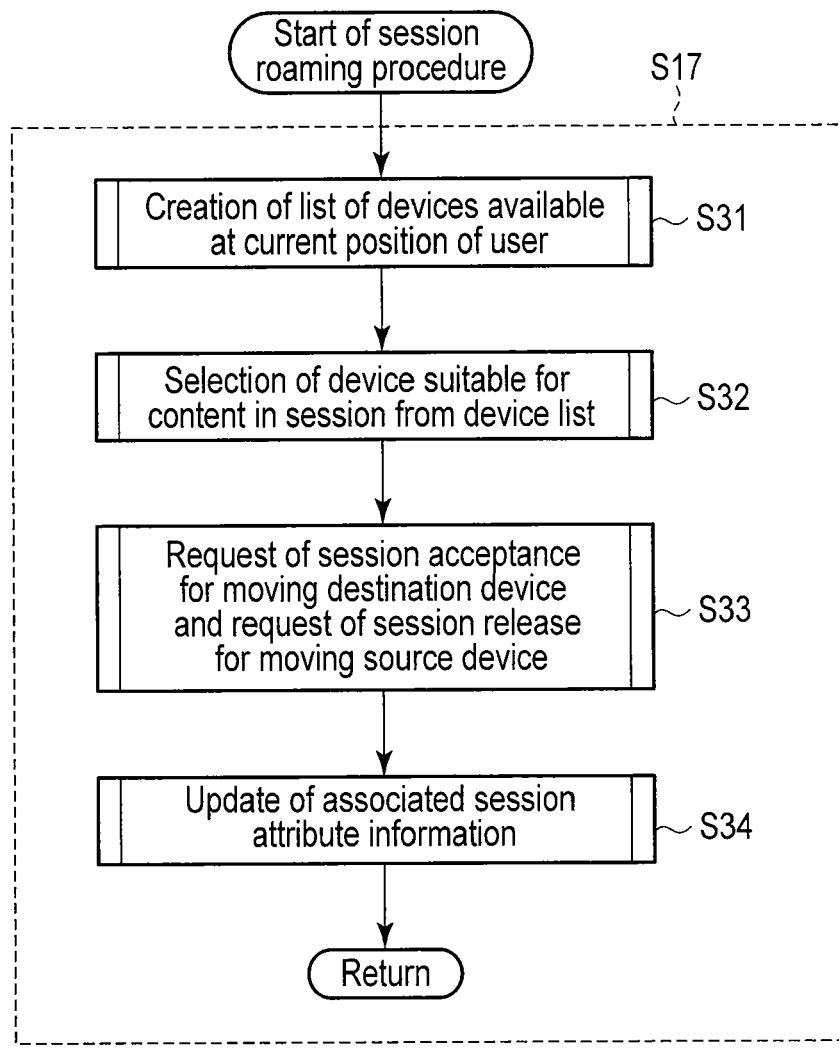
F I G. 12

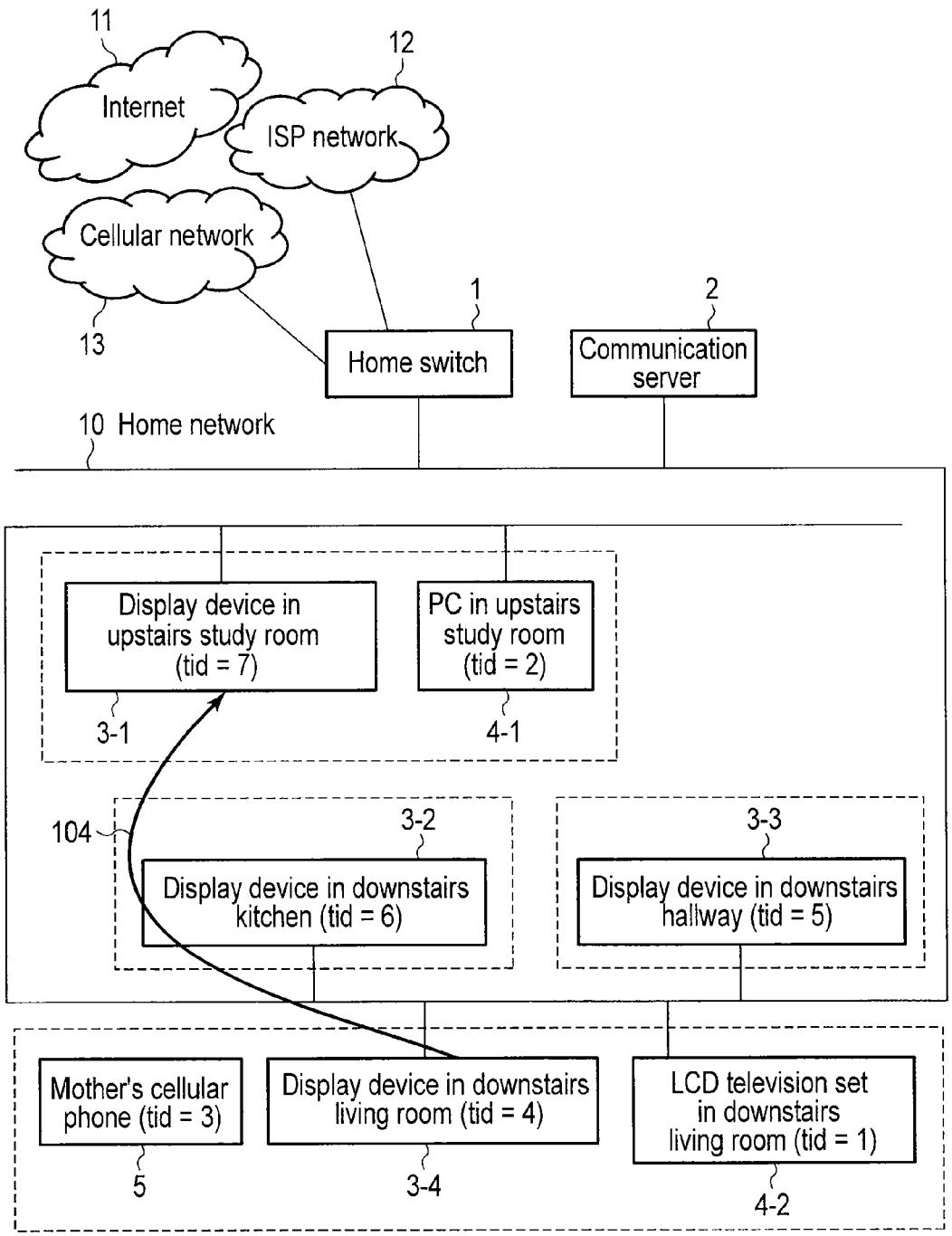
F I G. 13

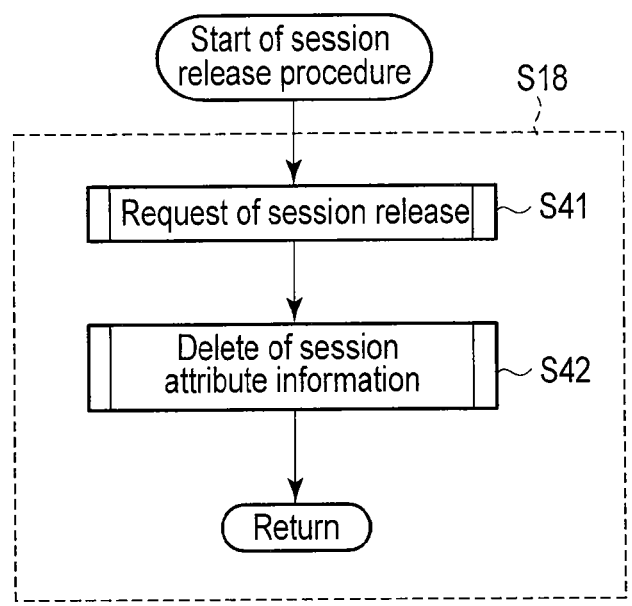
F I G. 14

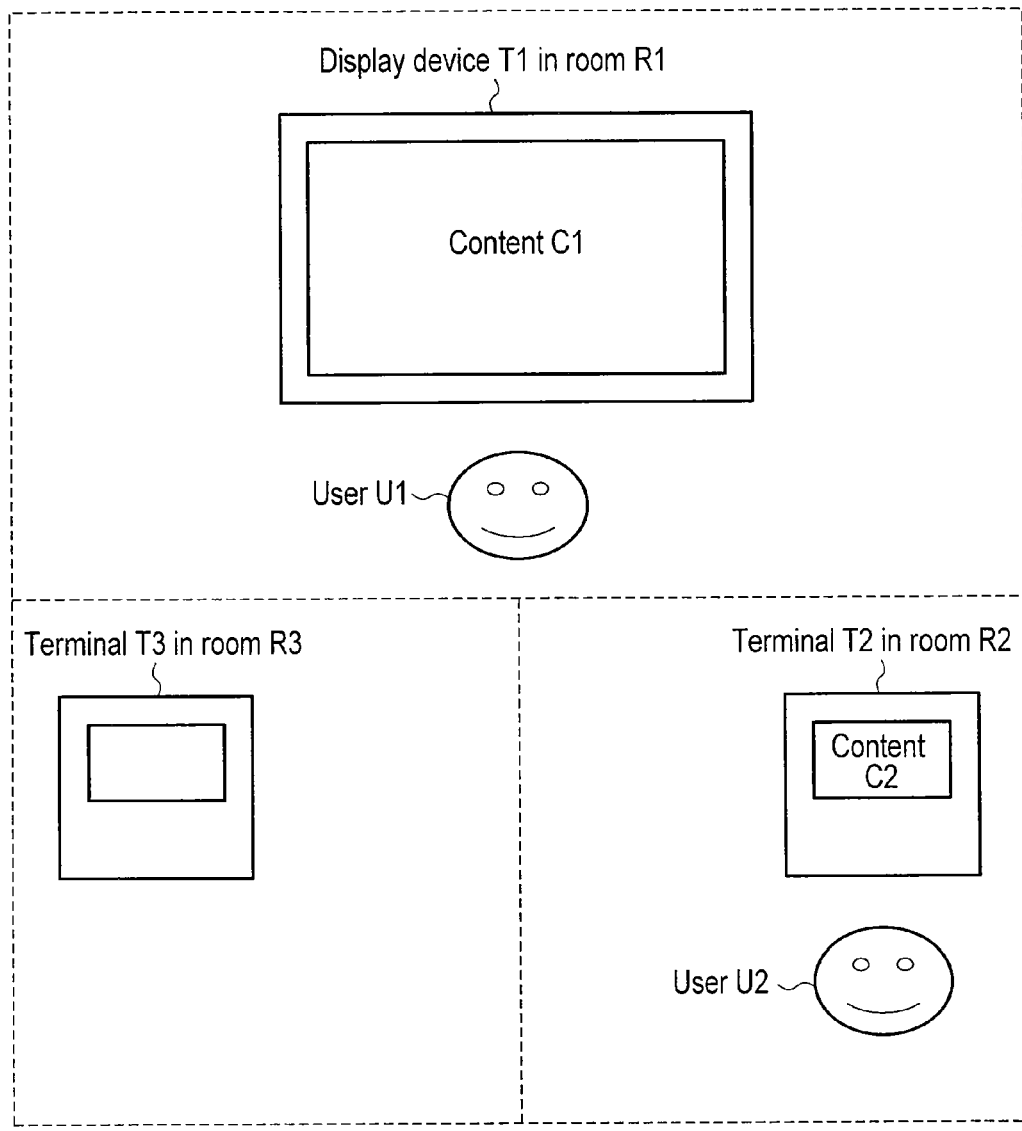
F I G. 19

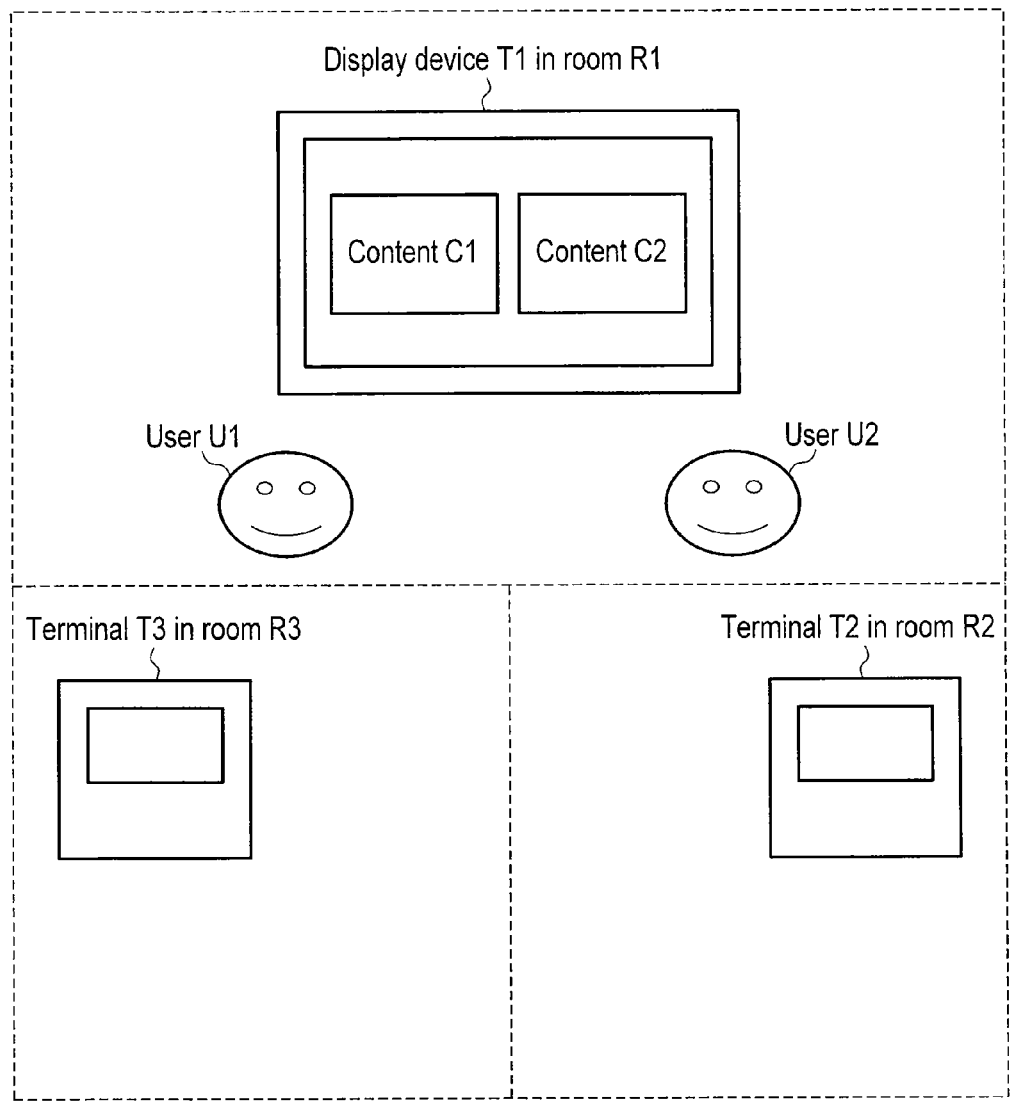
F I G. 20

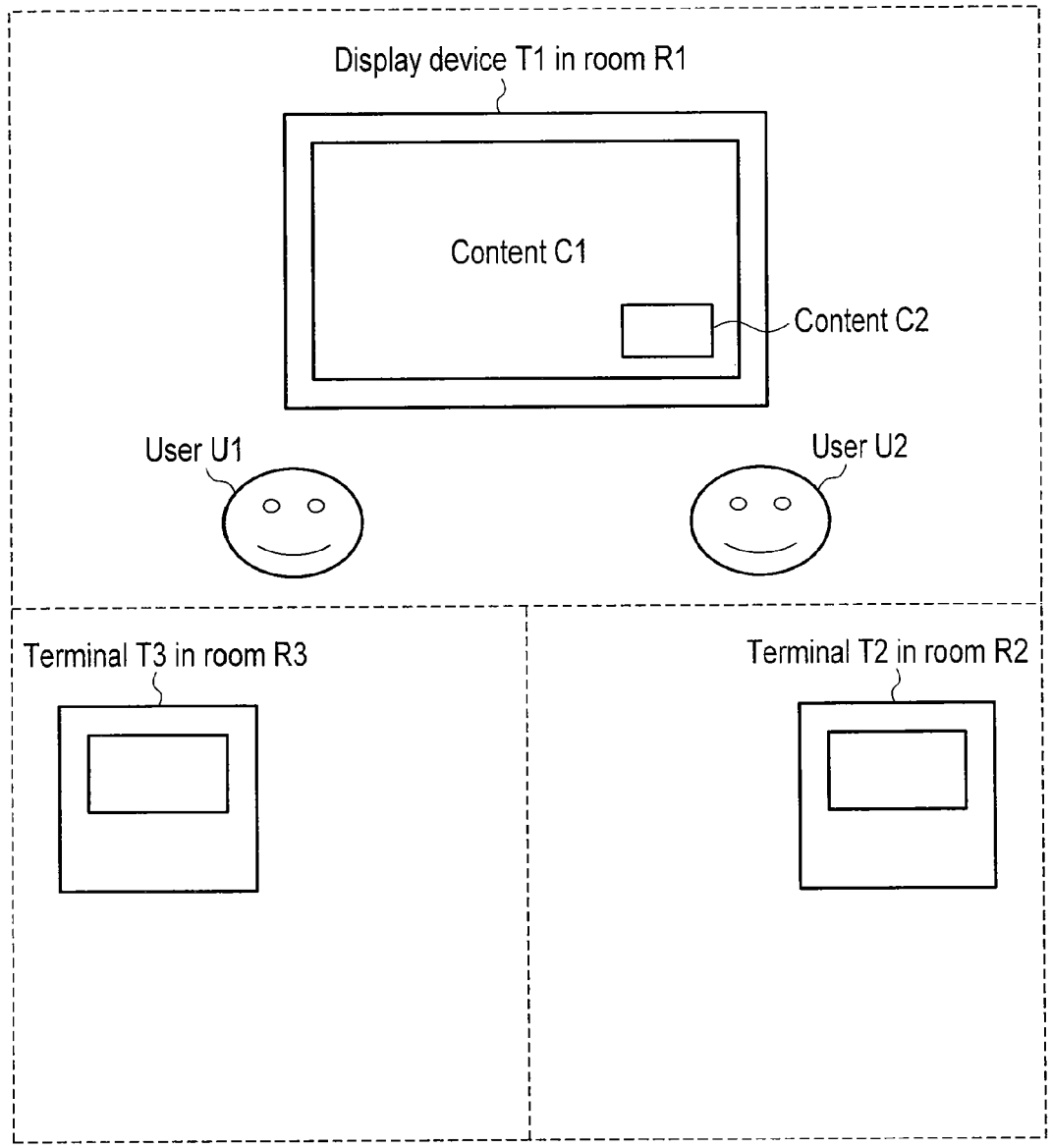
F I G. 21

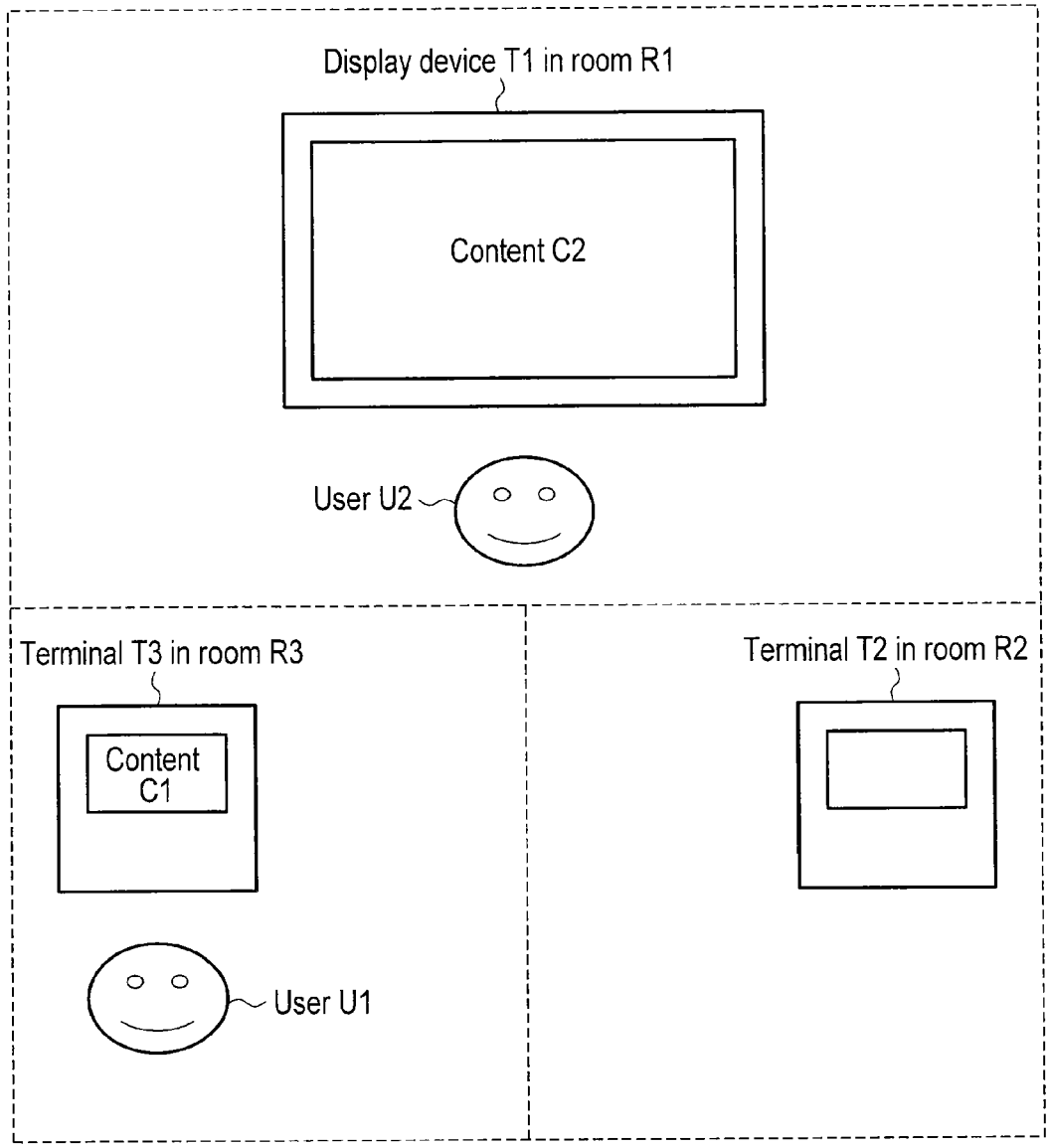
F I G. 22

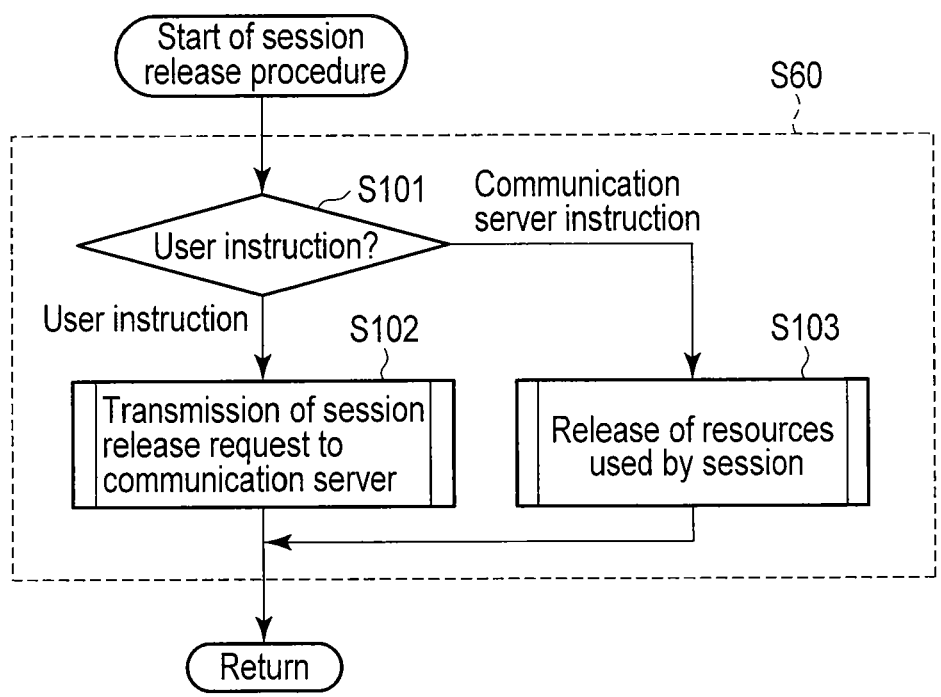
F I G. 23

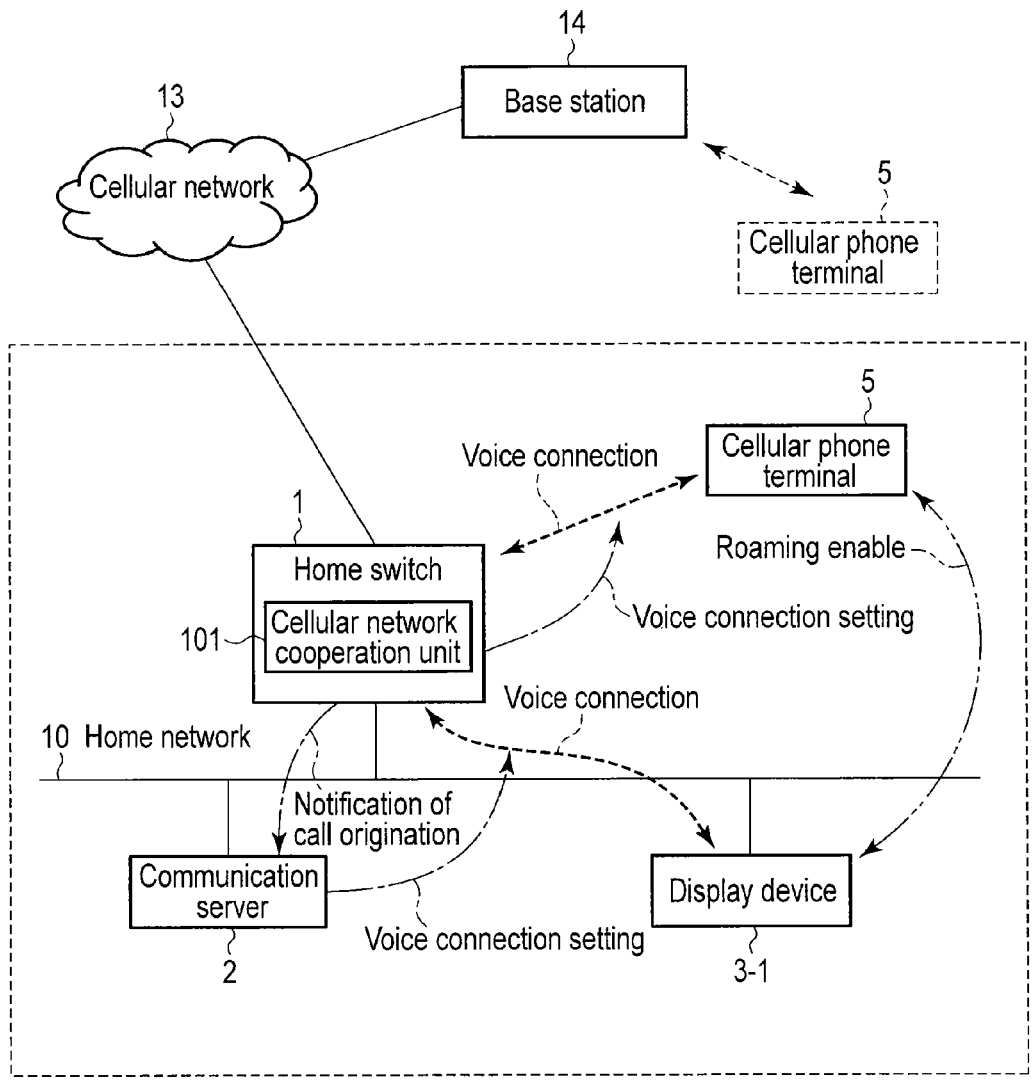
F I G. 24

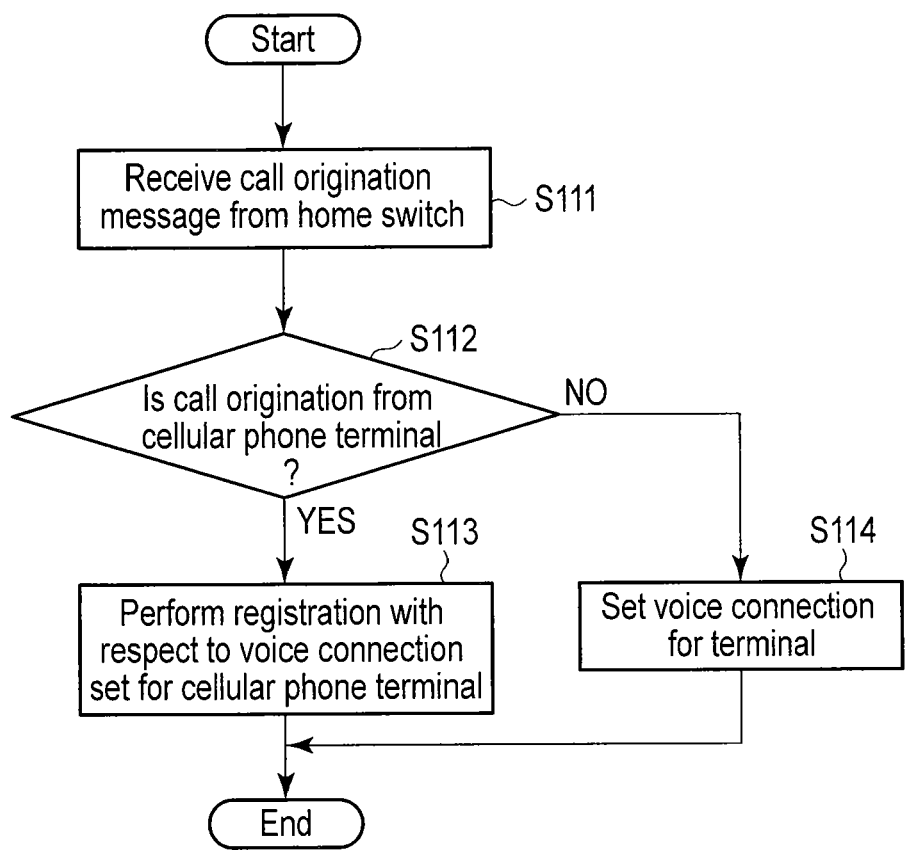
F I G. 25

COMMUNICATION SERVER AND SESSION CONTROL METHOD

CROSS REFERENCE TO RELATED APPLICATIONS

This application is a Continuation Application of PCT Application No. PCT/JP2009/069503, filed Nov. 17, 2009 and based upon and claiming the benefit of priority from prior Japanese Patent Application No. 2009-049370, filed Mar. 3, 2009, the entire contents of all of which are incorporated herein by reference.

FIELD

Embodiments described herein relate generally to a communication server and a session control method.

BACKGROUND

Conventionally, to acquire or view necessary information or a necessary content at a place to which a user moves (or visits), it is common to use a portable information device, such as a cellular phone terminal, or a notebook PC or PDA with a communication interface, which has been designed so as to be carried by a user. In consideration of portability, severe restrictions are imposed on the basic specifications of such a portable information device, such as a size, weight, power consumption, and communication bandwidth (see, for example, Japanese Patent No. 3818646, or Matsuzaki and Honiden, "A Programing Support Framework for Dynamic Process Deployment in Ubiquitous Environment", IPSJ (Information Processing Society of Japan) Journal, Vol. 47, No. 12, pp. 3188-3202, 15 Dec. 2006. In a portable information device, therefore, an application which has been designed by assuming use in a general PC and occupies many resources does not operate, or even if it does, it is troublesome to use because of low operation speed or it is hard to use because of many restrictions. These problems cause an inconvenience such that a cellular terminal cannot display a movie clip created using a PC.

Even if there is an information device such as a general PC, television set, or display device at a place to which a user moved, it is conventionally difficult to control the information device located in the vicinity of the user there so that the user can acquire or view desired information or a desired content at that place.

Furthermore, it is conventionally impossible to control one information device such as a general PC, television set, or display device to be shared by a plurality of users near the information device so that the plurality of users can simultaneously acquire or view different pieces of information or contents.

BRIEF DESCRIPTION OF THE DRAWINGS

FIG. 1 is a block diagram showing an example of the overall configuration of a communication system according to an embodiment.

FIG. 2 is a block diagram showing a practical example where a plurality of display devices and a PC and LCD television set as conventional terminals are arranged in a home.

FIG. 3 is a block diagram showing a configuration example of a display device according to the embodiment.

FIG. 6 is a block diagram showing a configuration example of a communication server according to the embodiment.

FIG. 7 is a view showing an example of session attribute information stored/maintained by a session attribute management unit of the communication server.

FIG. 8 is a view showing an example of a terminal list stored/maintained by a terminal list management unit of the communication server.

FIG. 11 is a block diagram for explaining session setting.

FIG. 12 is a flowchart illustrating a session roaming operation example of the communication server.

FIG. 13 is a block diagram for explaining session roaming when a user moves.

FIG. 14 is a flowchart illustrating a session release operation example of the communication server.

FIG. 19 is a view for explaining an example of session roaming involving two users.

FIG. 20 is a view for explaining an example of session roaming involving two users.

FIG. 21 is a view for explaining an example of session roaming involving two users.

FIG. 22 is a view for explaining an example of session roaming involving two users.

FIG. 23 is a flowchart illustrating an operation example of a session release procedure of the display device.

FIG. 24 is a block diagram showing another example of the overall configuration of the communication system according to the embodiment.

FIG. 25 is a flowchart illustrating a call origination processing example of the communication server.

DETAILED DESCRIPTION

Figures 4, 5:
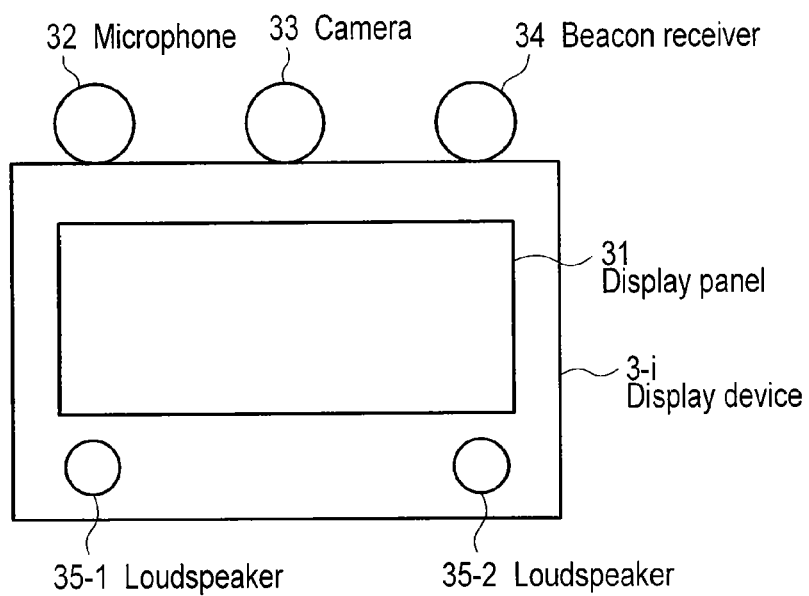
FIG. 4 is a view showing an example of the outer appearance of the display device.
FIG. 5 is a view showing an example of management information stored/maintained by a display resource management unit of the display device.

Referring to the accompanying drawings, devices such as communication servers and display devices according to the embodiments of the invention will be described in detail. In the embodiments, like reference numbers denote like elements, and no duplicate explanations will be given.

In general, according to one embodiment, a communication server is provided with a communication interface unit, a first storage unit, a session setting processing unit, a second storage unit and a session roaming processing unit. The communication interface unit connects to a network. The first storage unit stores terminal list information containing a terminal identifier for identifying a terminal and a position identifier for identifying a position of the terminal for each terminal, wherein the terminal is connected to the network and is capable of outputting a content. The session setting processing unit transmits, upon receiving a first message from the terminal, an instruction to set a session for outputting a content on the terminal to one or a plurality of terminals associated with the session, wherein the first message contains user identifier for identifying a user associated with the session, user position identifier for specifying a current position of the user, and content information about the content associated with the session. The second storage unit stores session attribute information containing the user identifier, the user position identifier and the content information associated with the session. The session roaming processing unit selects, when a second message containing the user identifier and the user position identifier of the user is received via the network after the session is set, and it is then determined based on the second message that the user moved, a terminal having a position identifier corresponding to the user position identifier after the user moved based on the terminal list information, and transmits, to a plurality of devices associated with session roaming to the selected terminal, an instruction to perform the session roaming.

According to the embodiment, it is possible to control an information device located in the vicinity of a user so that he or she can acquire or view desired information or a desired content at a place to which a user moved.

Further, according to another embodiment, a display device is provided with a display panel, a first control unit and a second control unit. The display panel displays a content. The first control unit allocates, if there are a plurality of contents requested to be displayed on the display panel, resources to be used for displaying the contents on the display panel. The second control unit controls to simultaneously display the plurality of contents on the display panel in accordance with the resource allocation.

According to the embodiment, it is also possible to control one information device such as a general PC, television set, or display device to be shared by a plurality of users near the information device so that they can simultaneously acquire or view different pieces of information or contents.

FIG. 1 is a block diagram showing a configuration example of a communication system according to the embodiment.

In this embodiment, a home network system provided in a home is used as a practical example of the communication system.

Referring to FIG. 1, reference numeral 1 denotes a home switch; 2, a communication server; 3-*i* (i=1 to m in the example of FIG. 1), a display device; 4-*j* (j=1 to n in the example of FIG. 1), an conventional terminal; 5, a cellular phone terminal; 10, a home network; 7, a presence sensor; 11, the Internet; 12, an ISP network; and 13, a cellular network.

The home network 10 provides communication within the home.

In the example of FIG. 1, the home network 10 is connected with the home switch 1, communication server 2, display devices 3-1 to 3-*m*, and conventional terminals 4-1 to 4-*n*. The home switch 1 and the communication server 2 may be arranged at arbitrary positions in the home, respectively. The display device 3-*i* and the conventional terminal 4-*j* are arranged at specific positions in the home, respectively (arrangement positions are managed). On the other hand, the cellular phone terminal 5 and the presence sensor 7 move within the home as a user carrying them moves. Note that other devices (for example, a hard disk recorder capable of recording a content such as a broadcast program, and the like) may be connected to the home network 10.

In this embodiment, assume that each user (for example, each member of the home) is assigned with a user identifier (user ID) for uniquely identifying the user. Note that the user ID may have any format including numeric characters, alphanumeric characters, and a character string. The presence sensor 7 (to be described later) is specifically provided for each user. Each presence sensor 7 holds the user ID of the user of itself.

The home switch 1 is connected with the ISP network 12 and cellular network 13 to communicate with them so that the user can use a service on the Internet 11 or cellular network 13 using a device on the home network 10.

The communication server 2 manages/controls communication performed on the home network 10. The communication server 2 controls communication between devices connected through the home network 10, and provides a service requested by the user.

The display device 3-*i* is arranged at an arbitrary position in the home, and is connected to the home network 10. The display device 3-*i* provides information services such as reproduction of a content including a broadcast program or recorded content at the position where it is installed. In this embodiment, various sensors of the display device 3-*i* perform user detection to determine whether a user assigned with a user ID is present near the display device 3-*i* itself (or whether the user entered or left the area near it). Assume that the display device 3-*i* has a function of providing information services such as reproduction of a content received via the home network 10. The display device 3-*i* may contain, for example, a hard disk recorder capable of recording and reproducing a content. Note that the number of display devices 3-*i* connected to the home network 10 is not particularly limited.

The conventional terminal 4-*j* is arranged at an arbitrary position in the home, and is connected to the home network 10. The conventional terminal 4-*j* is assumed to serve as a device such as a PC or LCD television set but is not limited to them. Any device may be used as long as the device has a function of connecting to the home network 10. Assume that the conventional terminal 4-*j* has a function of providing information services such as reproduction of a content received via the home network 10. The conventional terminal 4-*j* may contain, for example, a hard disk recorder capable of recording and reproducing a content. Note that the number of conventional terminals 4-*j* connected to the home network 10 is not particularly limited. As will be described later, a display device according to the embodiment desirably has a function of automatically detecting a user who came close, and then notifying a communication server of it, whereas an conventional terminal is a terminal that does not have such function.

The display devices 3-1 to 3-*m* and conventional terminals 4-1 to 4-*n* arranged in the home can exchange information (for example, messages, contents, and the like) via the home network 10. These devices can exchange information with the Internet 11, ISP network 12, and cellular network 13 through the home switch 1 connected to the home network 10.

The presence sensor 7 is implemented to have a very small size so as to be easy for the user to carry. The presence sensor 7 is a kind of transmitter which includes a close proximity wireless transfer means such as Bluetooth® to intermittently generate and transmit a beacon signal as a weak radio wave. Note that the beacon signal contains the user ID of the user of the presence sensor 7. Using the beacon signal generated by the presence sensor 7 carried by the user, the communication system can determine where in the home the user is present. That is, when the presence sensor 7 is detected by the beacon signal, the communication system can recognize that the user is currently present at a position where the presence sensor 7 has been detected, assuming that the user of the presence sensor 7 carries the presence sensor 7. Note that any method of setting, in the presence sensor 7, the user ID of the user of the presence sensor 7 may be used. Alternatively, the presence sensor 7 need not always be used.

The cellular phone terminal 5 is a terminal in a general cellular phone service, and is carried by the user to move in the home. Any number of cellular phone terminals 5 may exist, as a matter of course. In this embodiment, a case in which when the cellular phone terminal 5 is in the home, it makes communication with the cellular network 13 via the home switch 1 (that is, a case in which the home switch 1 has a function of a so-called femtocell small base station) will be explained by way of example. Note that the home switch 1 does not necessarily have a function of a femtocell small base station.

A case in which the cellular phone terminal 5 is used as a terminal in a cellular phone system will be described in this embodiment. It is also possible to consider the cellular phone terminal 5 having a function of providing information services such as reproduction of a content as the small conventional terminal 4-$j$ cooperating with the display device 3-$i$.

FIG. 2 shows a practical example when a plurality of display devices and a PC and LCD television set as conventional terminals are arranged in a home.

In this example, assume that family members are a father, a mother, a son, and a daughter. The four display devices 3-1 to 3-4 and two conventional terminals 4-1 and 4-2 are arranged on the home network 10. The conventional terminal 4-1 serves as a PC, and the conventional terminal 4-2 serves as an LCD television set.

Practical examples of the arrangement positions of the display devices 3-1 to 3-4 and conventional terminals 4-1 and 4-2 are as follows. As an example of the cellular phone terminal 5, a mother's cellular phone terminal is used.

Display device 3-1: upstairs study room
PC 4-1: upstairs study room
Display device 3-2: downstairs kitchen
Display device 3-3: downstairs hallway
Display device 3-4: downstairs living room
LCD television set 4-2: downstairs living room
Mother's cellular phone terminal 5: dynamically changes In this embodiment, terminals such as the display devices 3-1 to 3-4, the conventional terminals 4-1 and 4-2, and the cellular phone terminal 5 are assigned with terminal identifiers (terminal IDs) for uniquely identifying a terminal. Note that a terminal ID has any format including numeric characters, alphanumeric characters, and a character string. Any method of setting a terminal ID in each terminal may be used.

A terminal ID may be set in each of all terminals on the home network 10.

In this embodiment, assume that a position identifier (position ID) for uniquely identifying a location is assigned to each place in the home (for example, each room, a bathroom, a hallway, a staircase, or a porch in the home). Note that a position ID has any format including numeric characters, alphanumeric characters, and a character string. For example, a character string position ID such as "downstairs living room", "upstairs study room", "downstairs kitchen", or "downstairs hallway" may be assigned, or a numeric position ID such as "1" for "downstairs living room", "2" for "upstairs study room", "3" for "downstairs kitchen", or "4" for "downstairs hallway" may be assigned.

The terminal ID (tid) and position ID (pid) of each of the display devices 3-1 to 3-4, conventional terminals 4-1 and 4-2, and cellular phone terminal 5 are practically exemplified below. Note that pid of the cellular phone terminal 5 varies depending on movement of the user carrying it. In this example, assume that the mother carrying the cellular phone terminal 5 is in the downstairs living room.

Display device 3-1: tid=7, pid=upstairs study room
PC 4-1: tid=2, pid=upstairs study room
Display device 3-2: tid=6, pid=downstairs kitchen
Display device 3-3: tid=5, pid=downstairs hallway
Display device 3-4: tid=4, pid=downstairs living room
LCD television set 4-2: tid=1, pid=downstairs living room
Mother's cellular phone terminal 5: tid=3, pid=downstairs living room Note that for a terminal (for example, the display device 3-$i$, the conventional terminal 4-$j$, or the like) which should be managed in terms of the location, the communication server 2 manages a correspondence between the terminal ID of the terminal and a position ID assigned to a location where the terminal is arranged.

When transmitting a message to another device, each device may include its own terminal ID (or the terminal ID of itself and that of the transmission destination device) in the message. Upon receiving the message, the transmission destination device can recognize the position ID of the transmitting device from the terminal ID contained in the received message if it holds a correspondence table between the terminal IDs and position IDs of terminals.

Alternatively, when transmitting a message to another device, each device may include the position ID of itself in the message.

For a user assigned with a user ID, the communication server 2 manages a correspondence between the user ID of the user and a position ID indicating the current position of the user. It is possible to use, as a position ID indicating the current position of the user, a position ID assigned to a location where a device (the display device 3-$i$ in this embodiment) which has detected the user is arranged.

In this embodiment, assume also that identification information (content ID) which can uniquely specify a content is assigned at least to each content to be a target of session roaming control (to be described later). Note that a content ID may or may not contain information indicating a content location, or both types of content IDs may exist. In this embodiment, a case in which a content ID and information indicating a content location are separated will be explained.

The user of the communication system is a member of the home where the communication system is installed. An operation policy may be individually defined for each home. An individual home may arbitrarily decide user IDs, terminal IDs, and position IDs for respectively identifying users, terminals, and locations in the home.

The display device 3-$i$ according to this embodiment will be described next.

FIG. 3 shows a configuration example of the display device 3-$i$ according to this embodiment.

FIG. 4 shows an example of the outer appearance of the display device 3-$i$.

As shown in (a) of FIG. 3, the display device 3-$i$ of this embodiment includes a display panel 31, a microphone 32, a camera 33, a beacon receiver 34, loudspeakers 35-1 and 35-2, a display resource management unit 36, a user detection unit 37, a communication control unit 38, a reproduction control unit 39, and a communication interface unit 40. As shown in (b) of FIG. 3, the communication control unit 38 includes a session setting processing unit 381, a session roaming processing unit 382, a session release processing unit 383, and a user movement notification unit 384.

The display device 3-$i$ includes the communication interface unit 40, and can make communication via the home network 10.

The communication control unit 38 performs processing necessary for session control in the display device 3-*i*, and the like.

The reproduction control unit 39 performs processing necessary for reproduction control of a content in the display device 3-*i*, and the like.

When reproducing a content such as a broadcast program or recorded content, its video is displayed on the display panel 31, and its sound is output from the loudspeakers 35-1 and 35-2. FIGS. 3 and 4 show the two loudspeakers 35-1 and 35-2. However, an arbitrary number of loudspeakers may be used. The reproduction control unit 39 controls reproduction of the content.

Any kind of content may be processed. For example, the content may be a terrestrial broadcast program or satellite broadcast program, or may be provided from a server on the Internet or another device on the home network 10. If the display device 3-*i* contains or locally connects to a hard disk recorder capable of recording and reproducing a content or the like, the content may be locally acquired from the hard disk recorder or the like.

The user detection unit 37 performs user detection processing (to be described later) using, for example, the beacon receiver 34 or camera 33. The beacon receiver 34 or camera 33 may be used for other purposes, as a matter of course. Note that if user detection by face authentication (to be described later) is not performed, the camera 33 need not be provided (in this case, the camera 33 may be provided for other purposes, as a matter of course). If user detection by close proximity wireless communication (to be described later) is not performed, the beacon receiver 34 need not be provided (in this case, the beacon receiver 34 may be provided for other purposes, as a matter of course).

If the display device 3-*i* is used as a terminal in a cellular phone service, the microphone 32 is used. The microphone 32 may be used for other purposes, as a matter of course. Note that if the display device 3-*i* is not used as a terminal in the cellular phone service, the microphone 32 need not be provided (in this case, the microphone 32 may be provided for other purposes, as a matter of course).

The display resource management unit 36 stores/manages management information about the display device 3-*i* such as resource allocation for content display.

The display device 3-*i* of this embodiment is different from the conventional terminal 4-*j* in that the device 3-*i* has a function of detecting that a user assigned in advance with a user ID is present near itself (or that the user entered or left the area near it). Various methods of implementing this function are usable. A method of using close proximity wireless communication and that of using face authentication will be described below.

<Method of Using Close Proximity Wireless Communication for User Detection>

Assume that if close proximity wireless communication is used, a user carries the presence sensor 7 (for generating a beacon signal containing a user ID using, for example, a close proximity wireless communication means such as Bluetooth), as described above. Assume also that the display device 3-*i* includes the beacon receiver 34 for receiving the beacon signal generated by the presence sensor 7.

When the beacon receiver 34 receives the beacon signal, the user detection unit 37 detects that a user came close, and can determine which user came close by extracting the user ID contained in the received beacon signal. <Method of Using Face Authentication for User Detection>

If face authentication is used, for example, the display device 3-*i* holds, in advance, a face authentication table (not shown) in which previously created "reference face data" and "user ID" are registered in association with each other for each user. Based on an image output from the camera 33, the user detection unit 37 detects that a user came close, and performs authentication processing by comparing face data obtained by executing face authentication processing for the image output from the camera 33 with reference face data in the face authentication table. If there exists, in the face authentication table, reference face data based on which the user is determined as the same user, the user detection unit 37 can determine which user came close by acquiring a user ID corresponding to the reference face data.

Instead of holding the above table in the display device 3-*i*, the following method is applicable. That is, another device (for example, the communication server 2) holds the face authentication table. The display device 3-*i* transmits, to the other device, face data obtained by performing the face authentication processing. The other device then performs face authentication processing using the received face data, and returns the thus obtained user ID (or information indicating that the face authentication processing failed and it was impossible to obtain a user ID) to the display device 3-*i*.

Another user detection method may be used. Alternatively, a plurality of user detection methods may be used in combination.

The example of FIG. 2 assumes that at most one display device 3-*i* is arranged in one room. However, two or more display devices 3-*i* can be arranged in one room. If two or more display devices 3-*i* are arranged in one room, areas where the display devices 3-*i* detect a user may be set not to overlap each other. In this case, the room may be divided into a plurality of areas, and different position IDs (for example, "living room door side", "living room wall side", and the like) are assigned to the areas in the room.

In this embodiment, the display device 3-*i* includes a user detection function. However, the user detection function may be implemented as a user detection device separated from the display device 3-*i*, and the user detection device may provide a detection result for the display device 3-*i*.

If a user ID is acquired as described above, the communication control unit 38 transmits a message containing the user ID and the terminal ID of itself to the communication server 2 to inquire about control (for example, whether to display a content being viewed by the user who came close) associated with the user ID to receive an instruction.

In response to an instruction from the user, the communication control unit 38 uses the display panel 31 and the loudspeakers 35-1 and 35-2 to present a content to the user. Alternatively, in response to an instruction from the communication server 2, the communication control unit 38 uses the display panel 31 and the loudspeakers 35-1 and 35-2 to present a content being viewed by the user to the user who came close.

As shown in FIG. 5, the display resource management unit 36 stores/maintains management information containing "the user ID of a user viewing a content which is displayed by the display device 3-*i* itself", "information about the attributes of the content being displayed (content attributes)", and "information indicating a usage (usage status) of terminal resources used to display the content (terminal resource usage)".

Note that, for example, "content attributes" include:
"content ID" of a content being displayed in a session;
"type" of the content being displayed in the session (for example, an MPEG2 moving image, an MPEG4 moving image, an HDTV moving image, a still image, audio data, a Web page, or the like);

"location" of the content being displayed in the session (for example, a tuner of an LCD television set, a hard disk recorder in the home, a Web site outside the home, or the like);

"communication bandwidth" used in the session (for example, a fixed rate of 64 Kbps, a variable rate of 10 Mbps, a best effort rate, or the like); and "session roaming status" indicating whether session roaming due to movement of the user during the session is to be permitted (for example, "1" indicating that session roaming is permitted, or "0" indicating that session roaming is not permitted).

The display resource management unit 36 may be implemented as a program executed by the processor (not shown) of the display device 3-*i* together with various other functions of the display device 3-*i*.

The communication server 2 according to this embodiment will be explained next.

FIG. 6 shows a configuration example of the communication server 2 according to this embodiment.

As shown in (a) of FIG. 6, the communication server 2 of this embodiment includes a session attribute management unit 21, a terminal list management unit 22, a communication resource management unit 23, a communication control unit 24, and a communication interface unit 25. As shown in (b) of FIG. 6, the communication control unit 24 includes a session setting processing unit 241, a session roaming processing unit 242, and a session release processing unit 243.

The communication server 2 includes the communication interface unit 25, and can make communication via the home network 10.

The communication server 2 may be a general-purpose computer (for example, a desktop PC) connected to the home network 10.

The communication server 2 manages sessions on the home network 10. Assume that each session is managed by being assigned with an identifier (session ID) for uniquely identifying the session.

As shown in FIG. 7, the session attribute management unit 21 stores/maintains session attribute information containing "the session ID of a session to be controlled", "information about attributes of a target user of session control (user attributes)", "content attributes associated with a content being viewed by the user", and "the terminal ID of a terminal (for example, the display device 3-*i* or conventional terminal 4-*j*) on which the content being viewed is being displayed".

The user attributes contain, for example, the user ID of a user and a position ID assigned to a location where the user is currently present.

The content attributes contain, for example, a content ID, a content type, a content location, a communication bandwidth, session roaming status information, as described above.

As shown in (a) of FIG. 8, the terminal list management unit 22 stores/maintains a terminal list holding "the terminal ID of a terminal (for example, the display device 3-*i* or conventional terminal 4-*j*) used for content roaming on the home network 10" and "the position ID of a location where the terminal is arranged" in association with each other.

The communication resource management unit 23 stores/maintains information (communication resource information) indicating a resource usage for communication, such as "a bandwidth used for communication performed on the home network 10" and "a communication path".

The communication control unit 24 has a function of setting and releasing a session between necessary terminals in response to a user action by referring to a group of pieces of information maintained/managed by the session attribute management unit 21, terminal list management unit 22, and communication resource management unit 23.

A group of functions included in the communication server 2 may be implemented as software operating on a general-purpose computer.

As shown in (b) of FIG. 8, the terminal list held in the terminal list management unit 22 may be formed by associating "the terminal ID of a terminal used for content roaming on the home network 10", "the position ID of a location where the terminal is arranged", and "a list of the terminal IDs (neighboring terminal identifiers: neighboring terminal IDs) of terminals which are arranged near the location where the terminal is arranged, and can be simultaneously used by the user (to be referred to as neighboring terminals)".

A "neighboring terminal" practically indicates a terminal arranged at the same arrangement position as that of the terminal used for content roaming. The number of "neighboring terminals" of a certain terminal may be 0, 1, 2 or more. Referring to FIG. 2, while a neighboring terminal of the PC 4-1 in the study room is the display device 3-1 in the study room, a neighboring terminal of the display device 3-1 in the study room is the PC 4-1 in the study room. There is no neighboring terminal for the display device 3-3 in the downstairs hallway.

A user can view a content displayed on a terminal arranged at the same arrangement position (or the almost the same arrangement position) by, for example, moving his/her viewpoint and/or moving himself/herself a little. This fact can be used to implement a convenient function of selecting a terminal having an appropriate capability in roaming, and displaying a content on the selected terminal.

It is desirable to also add, to the neighboring terminal list, conventional terminals not having a function of automatically detecting a user who came close. With this operation, according to a session roaming procedure to be described in detail later, a display device having a function of automatically detecting a user who came close can detect that the user came close to notify the communication server of it. If it is desirable to display, on an conventional terminal, a content being viewed by the user, the display device can cause the conventional terminal to display the content. That is, the display device can detect the user instead of the conventional terminal.

Furthermore, the terminal list in (a) or (b) of FIG. 8 may hold the performance of each terminal in association with other information.

The above-described terminal list held in the terminal list management unit 22 needs to be stored in the terminal list management unit 22 in advance in operation of the home network 10. There are various methods of creating this information but any method may be used. As an example, assume that a user registers, in advance, the information in the terminal list management unit 22.

With reference to FIGS. 9 to 14, the operation of the communication server according to the embodiment will be described next.

In this embodiment, a request message from a terminal on the home network 10 includes at least a session setting request message, a session roaming request message, and a session release request message. Assume that each of these request messages is generated in the following case.

A session setting request is generated when a user newly starts viewing a content.

A session roaming request is generated when a user moves within the home.

A session release request is generated when a content being viewed by a user ends, or a user terminates (stops) viewing of a content.

Figure 9:
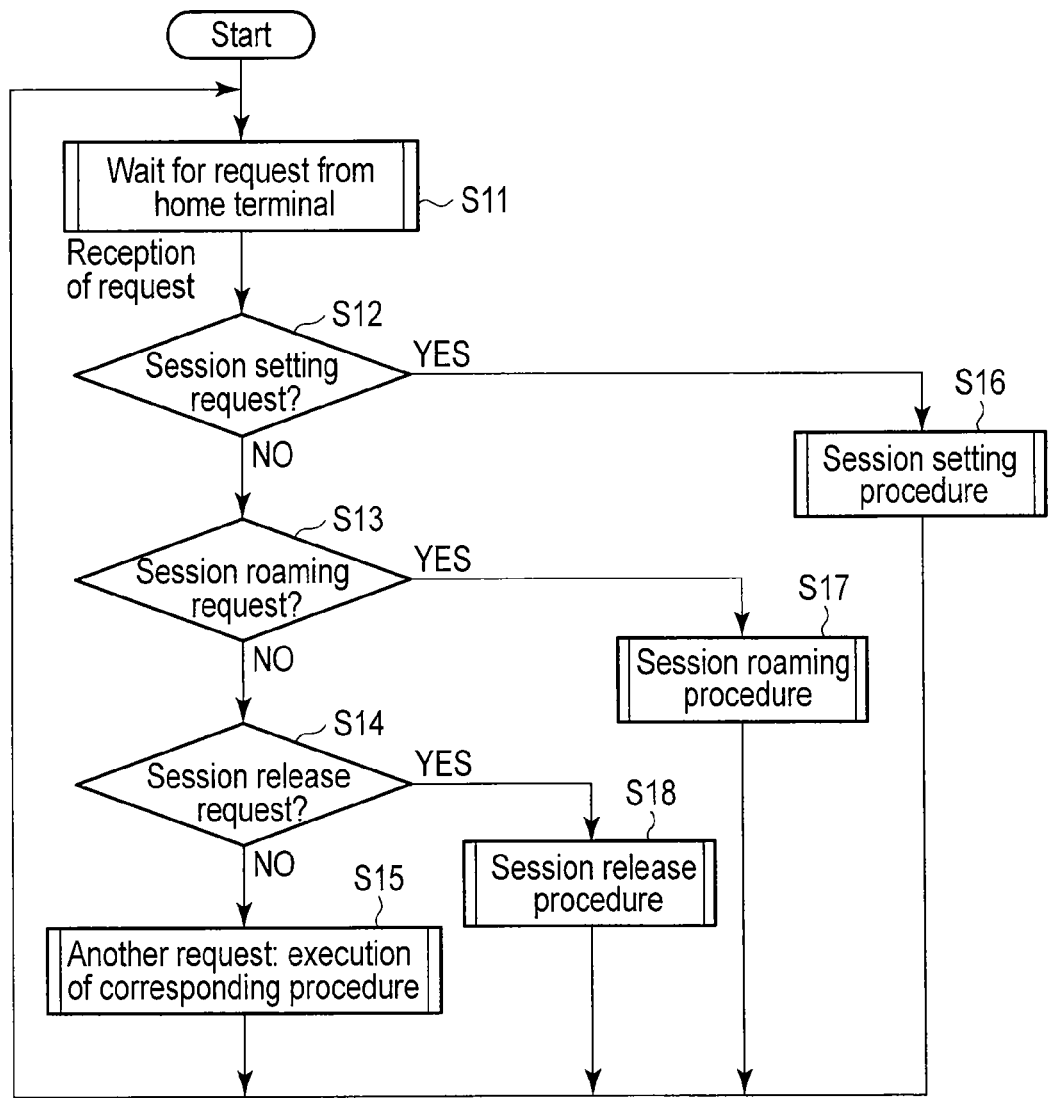
FIG. 9 is a flowchart illustrating an operation example of the communication server.
Figure 10:
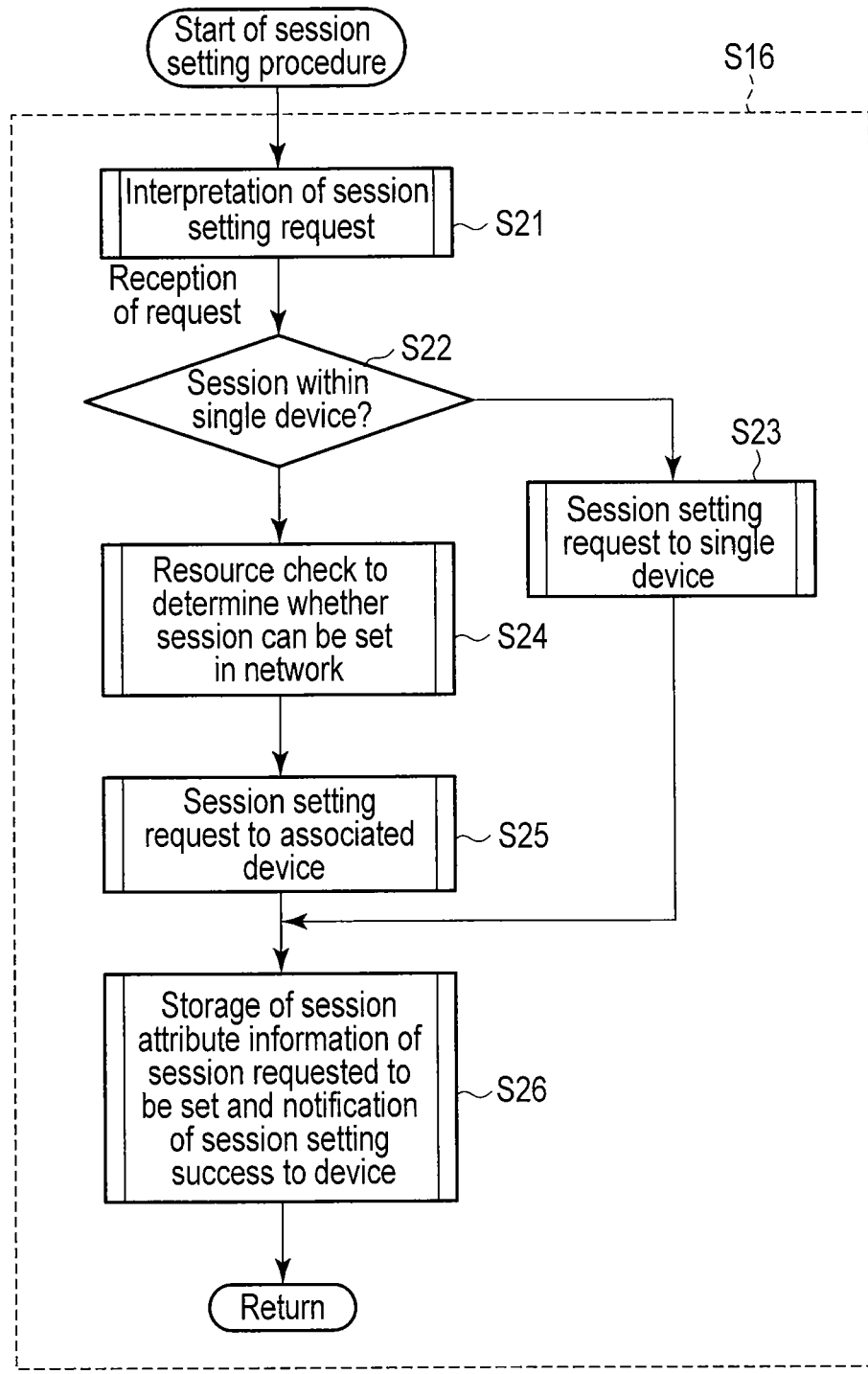
FIG. 10 is a flowchart illustrating a session setting operation example of the communication server.

FIG. 9 shows an operation example of the communication control unit 24 of the communication server according to the embodiment. FIG. 10 shows an example of a session setting procedure (step S16 in FIG. 9) performed by the session setting processing unit 241. FIG. 12 shows an example of a session roaming procedure (step S17 in FIG. 9) executed by the session roaming processing unit 242. FIG. 14 shows an example of a session release procedure (step S18 in FIG. 9) performed by the session release processing unit 243.

With reference to FIG. 9, the overall operation of the communication control unit 24 of the communication server 2 will be explained first.

After startup, the communication control unit 24 of the communication server 2 waits for various requests from terminals (for example, the display devices 3-$i$ and conventional terminals 4-$j$) on the home network 10 (step S11).

Upon receiving a request from a terminal on the home network 10, the communication control unit 24 of the communication server 2 interprets the message, and executes a procedure predetermined for each request.

The unit 24 determines whether the request is a session setting request (step S12). If the request is a session setting request, the unit 24 performs the session setting procedure (step S16), and then returns to a request waiting state.

The unit 24 determines whether the request is a session roaming request (step S13). If the request is a session roaming request, the unit 24 performs the session roaming procedure (step S17), and then returns to a request waiting state.

The unit 24 determines whether the request is a session release request (step S14). If the request is a session release request, the unit 24 performs the session release procedure (step S18), and then returns to a request waiting state.

If the request from the terminal is a request of a type other than the above three types (NO in all of steps S12 to S14), the unit 24 performs a procedure corresponding to the request (step S15).

The order of steps S12 to S14 may be different from that shown in FIG. 9. The type of request may be determined in one step, and the process may branch according to the determination result.

The operation of the communication server 2 will be described below with respect to the session setting procedure, session roaming procedure, and session release procedure.

<Session Setting Procedure>

With reference to FIG. 10, an operation example of the session setting processing unit 241 of the communication server 2 for the session setting procedure (step S16 in FIG. 9) will be explained.

When a user newly starts viewing a content, the user operates to input, to a terminal (for example, the display device 3-$i$ or conventional terminal 4-$j$), a command to display the desired content. For example, the user inputs a command to display a desired Web page using the mouse or keyboard of the PC 4-1, or inputs, to the LCD television set 4-2, a command to display a desired program using the remote control unit of the LCD television set.

Upon accepting the command input by the user, the terminal creates a session setting request message corresponding to the command, and transmits it to the communication server 2.

Upon receiving the session setting request message, the session setting processing unit 241 of the communication server 2 interprets the session setting request message (step S21), and determines the type of session to be set.

The session setting request message contains session attribute information.

The session attribute information contains attributes (user attributes) about a user who is viewing a content in the session and attributes (content attributes) about the content displayed in the session.

The user attributes contain, for example, "the user ID of the user who has requested the session" and "the position ID (for example, a living room, a kitchen, a study room, or the like) of the current position of the user who has requested the session".

The content attributes contain, for example, a content ID, a content type, a content location, a communication bandwidth, and a session roaming status, as described above.

The information such as a content type, location, and communication bandwidth contained in the content attributes is defined for each content selected when the user sets a session.

A practical structure of these pieces of information may be formed using, in combination, techniques standardized by various standards organizations, as needed. For example, a technique standardized by the IETF such as SDP (Session Description Protocol) is used for a content type, an Ethernet® address or IP address assigned to a terminal for sending a content to the home network 10 is used for a content location, and a technique standardized by the IETF like Intsrv/Diffserv is used for a communication bandwidth. Note that the practical structure of the information is not particularly limited. In this example, assume that the information about content attributes is configured by a predetermined method.

The user ID (of the user who has requested the session) and the position ID (of the current position of the user who has requested the session) contained in the user attributes will now be explained.

The user ID contained in the user attributes will be described first.

In the practical example, assume that it is a member of the home who uses the communication system, and an operation policy is individually defined for each home. Each home arbitrarily decides a user ID (uid) for identifying a user when the operation of the communication system starts or is in operation. For example, it may be decided that the father has uid=1, the mother has uid=2, the son has uid=3, and the daughter has uid=4. The communication server 2 holds these user IDs.

Using the session attribute information in the session attribute management unit 21, the communication server 2 can manage who is viewing (user ID), where the user is viewing (position ID), and what is being viewed by the user (content ID) using the user ID as a key.

There are various methods of setting the determined user ID of the user in the communication server 2 or the terminal but any method may be adopted. In this example, assume that the user directly sets the user ID, as needed.

To contain the user ID in the session setting request message, the terminal needs to determine who has requested the session when setting the session. A method in which the terminal recognizes the user who has requested the session varies depending on the capability of a terminal used by the user. If, for example, the terminal serves as a "PC" (for example, the PC 4-1 in the practical example), the PC may store a login name used to log in and the user ID in association with each other, and the user ID to be contained in the session setting request message may be acquired using the login name assuming that the login user has requested the session. Alternatively, if the terminal serves as an "LCD television set" (for example, the LCD television set 4-2 in the practical example), the following method may be used. That is, some buttons of the remote control unit of the LCD television set are assigned to individual users (for example, when a certain button is pressed, "father" is indicated), and a user is instructed to press a button to start a session. If the display device 3-*i* of this embodiment is used, it is possible to adopt a method in which the beacon receiver 34 receives a beacon signal transmitted from the presence sensor 7 and a user ID contained in the received beacon signal is used, or a method in which the camera 33 monitors the environment, a user using the device is recognized by authenticating the face of the user within the visual field of the camera 33, and then the user ID of the user is used. In the following description, assume that the system uses one of the above-described methods to determine a user who has performed session setting.

The position ID (of the current position of the user) contained in the user attributes will be described next.

In the case of movement support using an conventional technique, a protocol for movement support determines not the current position of the user but the current position of a mobile terminal (in the case of the cellular network 13 or the like) estimated to be held by the user or that of a host (in the case of SIP URL or the like) estimated to be used by the user. That is, in session setting, the current position of the terminal is considered as that of the user. Consequently, even if the user does not actually have the mobile terminal (for example, the user left the cellular phone terminal 5 somewhere else) or the user has not actually logged in to a host, the system sets a session for the terminal. As a result, information required by the user cannot be provided at a necessary timing. For example, the cellular phone terminal 5 left on a desk receives a call, or a host which the user has not logged in receives a call from an IP phone. In the case of a television set which does not support session roaming, the user may forget to switch off the television set, which may then display a program even though nobody views the program, resulting in wasteful energy consumption.

In this embodiment, the system recognizes not the current position of the mobile terminal of a user but the current position of the user himself/herself. With this operation, the following convenience is obtained. That is, a host does not receive a call from an IP phone if the user has not logged in, and it is possible to immediately notify the communication partner that the user is not present in the system. Furthermore, if nobody is watching a TV, the TV is turned off.

As described above, in this communication system, when a session is set, a terminal determines a user who has requested the session setting, thereby considering that the user is present near the terminal used to set the session. In this example, the following description will be given by assuming that the user who has set the session is present near the terminal used to set the session, and a subsequent operation progresses using the arrangement position of the terminal as the current position of the user.

In the procedure of FIG. 10, the session setting processing unit 241 of the communication server 2 determines whether to set a session within the same terminal or a session between a plurality of terminals connected through the home network 10 (step S22).

Referring to FIG. 11, reference numeral 101 denotes a case in which a session is set within the same terminal; 102, a case in which a session is set between a plurality of terminals connected only through the home network 10; and 103, a case in which a session is set between a plurality of terminals connected through the home network 10 and the external networks 11 and 12.

If a session is set within a single terminal, the unit 241 transmits a session setting instruction message to the terminal to instruct session setting (step S23). Even if a session is set within the single terminal, the terminal sends the session setting request to the communication server 2, because this operation enables the communication server 2 to hold information necessary for subsequent processing such as session roaming.

Alternatively, if a session requested to be set is set via the home network 10, the remaining communication resources of the home network 10 are checked to determine whether or not setting the session exerts an adverse influence on other communication (step S24).

Whether it is possible to set a session depends on a content location and the resource usage of the home network 10. If there exists a content in the terminal which has requested session setting (for example, when a content required to be viewed by a session setting request from an LCD television set is provided by one of broadcast channels received by the LCD television set), that is, if a session is set within a single terminal, the above determination process is performed only based on the usage of the terminal without using the resources of the home network 10, ISP network 12, cellular network 13, and Internet 11. Alternatively, if there is no content required to be viewed in the terminal (for example, when IPTV is viewed or when a Web search is performed by a PC), the above determination process needs to be performed based on the usage of the home network 10, ISP network 12, and cellular network 13 in addition to the resource usage of the terminal.

If it is determined that it is impossible to set a session as a result of the determination process, it is desirable to notify the request source terminal of it.

If it is possible to set a session, a session setting instruction message is transmitted to a sending device (content source) and receiving device (content sink) of the content exchanged in the session, thereby instructing session setting (step S25).

The session setting instruction message contains the session attribute information contained in the session setting request message.

In the session setting instruction procedure, it is determined whether it is necessary to set a communication channel for the session setting. If a content to be displayed in the session is located in a content server (not shown) outside the home network 10, and it is necessary to receive the content via the home switch 1, a communication channel is set between the home switch 1 and the content server (not shown) as an information source which holds the content. A detailed method of setting a communication channel varies depending on the configuration of the home network 10, cellular network 13, and ISP network 12 but this has no influence on the effectiveness of this embodiment. The following description will be given by assuming that a necessary method sets a communication channel.

If communication channel setting has failed, it is desirable to notify the terminal that session setting has failed.

If communication channel setting has succeeded, the home switch 1 serves as a content source for a terminal connected to the network from then on.

Since communication preparation is made for the terminals associated with the session requested to be set, session setting is performed, communication is requested to start, and then this procedure ends.

The session attribute management unit 21 holds the session attribute information associated with the set session in association with the user ID (that is, the user ID contained in the received session setting request message) of the user involved in the session (step S26).

After that, the session setting processing unit 241 of the communication server 2 notifies the terminal that session setting has succeeded.

Upon receiving the notification that session setting has succeeded, the terminal starts to display the content requested by the user.

<Session Roaming Procedure>

With reference to FIG. 12, an operation example of the session roaming processing unit 242 of the communication server 2 for the session roaming procedure (step S17 in FIG. 9) will be described.

When a user moves in the home, the display device 3-*i* detects movement of the user according to a predetermined method.

As a method of detecting movement of the user, various methods are applicable, such as a method of using the above-described face recognition technique and a method of using a presence sensor. In this example, the following description will be given by assuming that a predetermined method detects movement of the user.

Upon detecting movement of a user, the display device 3-*i* transmits, to the communication server 2, a session roaming request message indicating it. Note that if the display device 3-*i* detects that the user left the area, it transmits a session roaming request message which contains information indicating that the user left the area and the user ID of the user. If the display device 3-*i* detects that the user entered the area, it transmits a session roaming request message which contains information indicating that the user entered the area and the user ID of the user.

If one user moves, the communication server 2 receives, from the display device 3-*i* as a moving source, the session roaming request message indicating that the user left the area, and receives, from the display device 3-*i* as a moving destination, the session roaming request message indicating that the user entered the area. By referring to the two messages, the communication server 2 can recognize that the user moved from near the display device 3-*i* as a moving source to near the display device 3-*i* as a moving destination.

Referring to FIG. 13, reference numeral 104 denotes a case in which a user who viewed a program using the display device 3-4 in the downstairs living room moves to the upstairs study room to continue viewing the program using the display device 3-1 in the upstairs study room. In this case, the display device 3-4 in the downstairs living room transmits, to the communication server 2, a session roaming request message which contains information indicating that the user left the area, and the display device 3-1 in the upstairs study room transmits, to the communication server 2, a session roaming request message which contains information indicating that the user entered the area.

If the session roaming request message is not received from the display device 3-*i* as a moving source for some reason, the session roaming procedure may be performed when the session roaming request message is received from the display device 3-*i* as a moving destination.

Alternatively, if the session roaming request message is received from the display device 3-*i* as a moving source, and no session roaming request message is received from any display device as a moving destination, the user is considered to have gone out, and all sessions associated with the user may be forcibly terminated. Furthermore, the main power supply of a display device or conventional terminal which displays only information associated with the forcibly terminated sessions may be turned off. This can reduce wasteful energy consumption caused when the TV is on while nobody is watching it.

Upon receiving the session roaming request message, the session roaming processing unit 242 of the communication server 2 performs the following operation.

The unit 242 creates a list of devices available at the current position of a user based on the position ID of the current position (after movement) of the user (step S31).

After it is confirmed that it is possible to perform roaming of a content being viewed by the user while referring to the information held in the terminal list management unit 22, the session roaming processing unit 242 of the communication server 2 selects, as a moving destination device, a device most suitable for the content being viewed by the user among the display devices 3-*i* available at the current position of the user (step S32).

As the display device 3-*i* most suitable for the content being viewed by the user, a device having hardware necessary for display according to the type of content may be selected. If, for example, the content is an HD moving image, a device having a function of displaying an HD moving image is selected.

After that, the communication server 2 transmits a resource reservation request message to the device selected as a moving destination device to instruct to receive the content being currently viewed by the user while transmitting a resource release request to the device (moving source device) which displays the session information during roaming to instruct to release associated sessions (step S33).

In this case, details of the procedure of switching a display destination from the moving source device to the moving destination device, and changing the device which displays the content are not particularly limited. One of various methods well known as a so-called handover may be selected according to the characteristics of the home network 10, as needed.

After the display which displays the content is changed, the communication server 2 updates user information held in itself (step S34), and ends migration of the content.

In step S32, if it is impossible to perform roaming of the content being viewed by the user, it is impossible to continue viewing the content using a moving destination device, and therefore the procedure may be aborted to transit to the next session release procedure. Alternatively, if it is impossible to perform roaming of the content being viewed by the user, this procedure may be aborted, and reproduction of the content may be paused. Then, the device may wait for the user to return to the original position for a certain period of time. If the user returns to the original position before the certain period of time elapses, the device may restart reproduction. If the user does not return to the original position before the certain period of time elapses, the procedure may be aborted to transit to the next session release procedure.

<Session Release Procedure>

With reference to FIG. 14, an operation example of the session release processing unit 243 of the communication server 2 for the session release procedure (step S18 in FIG. 9) will be explained.

The session release procedure is performed when the content being viewed by the user ends or the user terminates (stops) viewing of the content.

When the user terminates viewing of the content, for example, he/she terminates display of a desired Web page using the mouse or keyboard of the PC 4-1, or inputs a command to the LCD television set 4-2 using the remote control unit of the LCD television set to terminate display of a desired program. Then, the terminal creates a session release request message, and sends it to the communication server 2.

Upon receiving the session release request message, the session release processing unit 243 of the communication server 2 transmits a session release instruction message to devices associated with the session to instruct to release the session (step S41). At this time, if a content to be displayed exists on an external network such as the Internet 11, ISP network 12, or cellular network 13, upon receiving a command from the user, the device instructs the content server (not shown), which holds the content specified for the communication server 2, to release a set communication channel.

After that, the session release processing unit 243 of the communication server 2 deletes, from the session attribute management unit 21, session attribute information associated with the user ID (that is, a user ID contained in the received session release request message) of the user involved in the session (step S42).

As described above, according to this embodiment, since a user ID for identifying a user is associated with a content being viewed by the user, it is possible to display the content being viewed by the user on a display device available at the current position of the user by detecting movement of the user. With this operation, the user can continue to view a content using a display device arranged at a moving destination without carrying a portable information device. For example, if the user moves to a bedroom while viewing a movie on an LCD television set in a living room, he/she can continue to view the movie using a display device in the bedroom. Furthermore, if the communication server 2 finds a terminal around which there is no user, it is possible to instruct the terminal to enter an operation state in which only a user detection function operates. Then, the terminal operates to turn off the TV since there is no user.

The operation of the display device 3-$i$ according to this embodiment will be described with reference to FIGS. 15 to 23.

Figure 15:
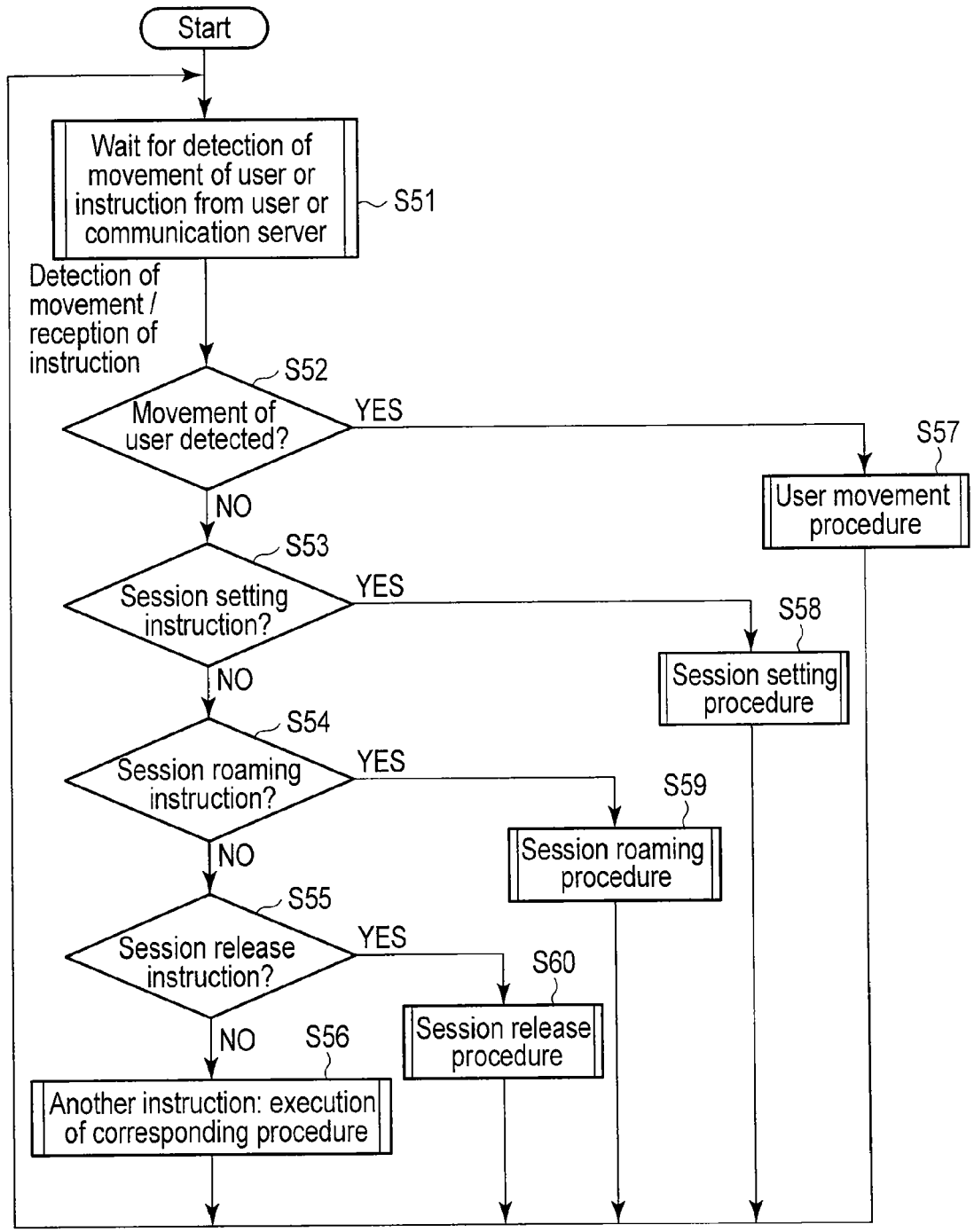
FIG. 15 is a flowchart illustrating an operation example of the display device.
Figure 16:
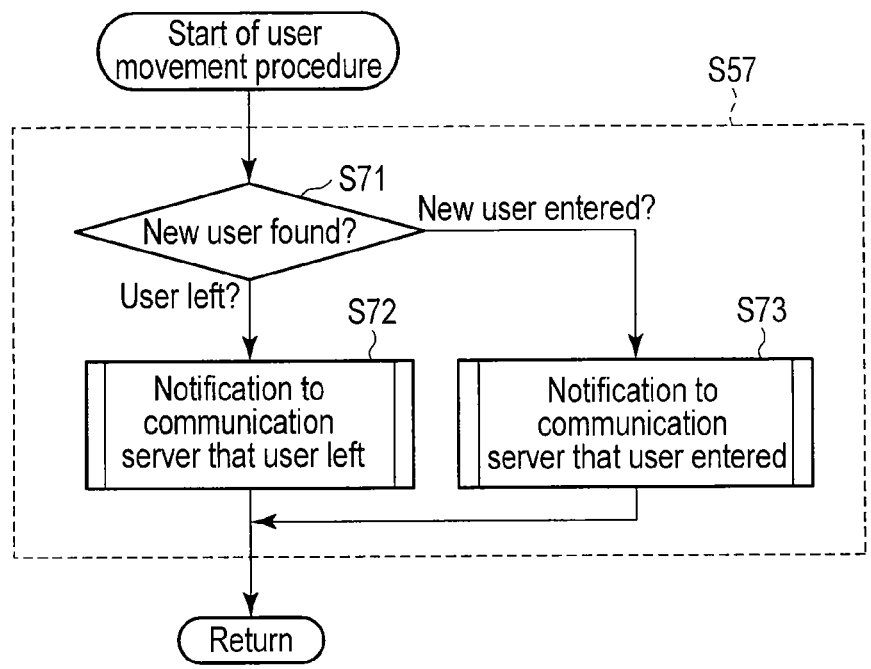
FIG. 16 is a flowchart illustrating an operation example of a user movement procedure of the display device.
Figure 17:
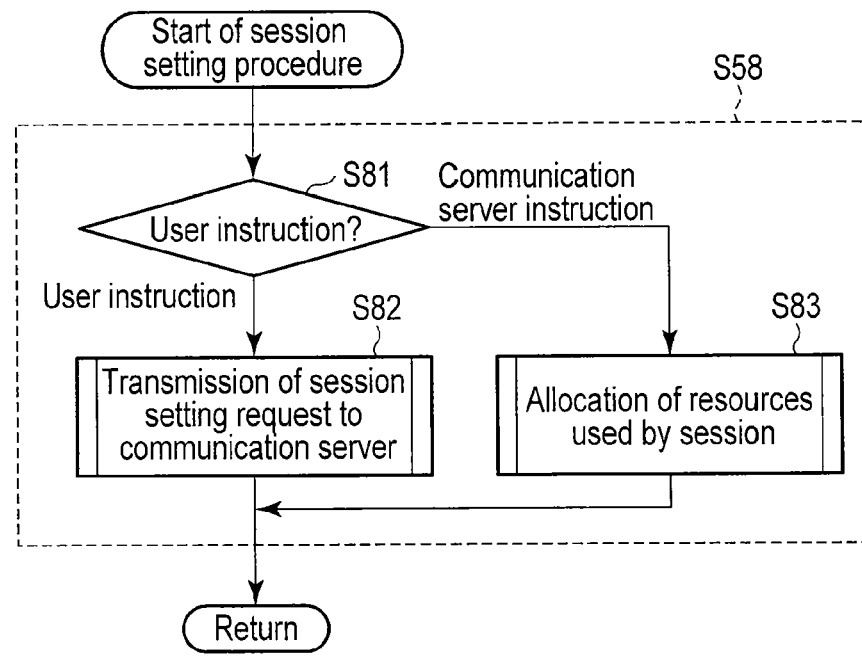
FIG. 17 is a flowchart illustrating an operation example of a session setting procedure of the display device.
Figure 18:
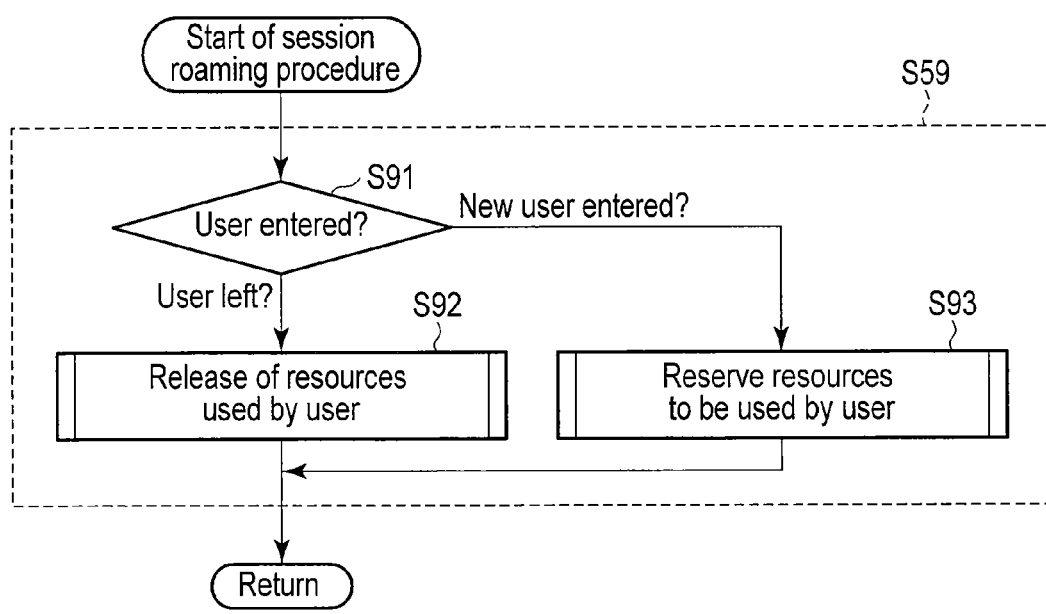
FIG. 18 is flowchart illustrating an operation example of a session roaming procedure of the display device.

FIG. 15 shows an operation example of the communication control unit 38 of the display device 3-$i$ according to this embodiment. FIG. 16 shows an example of a user movement detection procedure (step S57 in FIG. 15) performed by the user movement notification unit 384. FIG. 17 shows an example of a session setting procedure (step S58 in FIG. 15) executed by the session setting processing unit 381. FIG. 18 shows an example of a session roaming procedure (step S59 in FIG. 15) performed by the session roaming processing unit 382. FIG. 23 shows an example of a session release procedure (step S60 in FIG. 15) executed by the session release processing unit 383.

The overall operation of the communication control unit 38 of the display device 3-$i$ will be explained first with reference to FIG. 15.

After startup, the communication control unit 38 of the display device 3-$i$ attempts to detect movement of a user in the home or waits for an instruction from a user or the communication server 2 (step S51).

Upon detecting movement of a user or receiving an instruction from a user or the communication server 2, the communication control unit 38 exits from step S51 as a waiting state, and executes a procedure predetermined for each event.

The unit 38 determines whether the user has moved (step S52).

If the user has moved, the unit 38 executes the user movement procedure (step S57), and then returns to a movement detection/instruction waiting state.

It is determined whether the unit 38 has received a session setting instruction (step S53). If the unit 38 has received the session setting instruction, it executes the session setting procedure (step S58), and then returns to a movement detection/instruction waiting state.

After that, it is determined whether the received instruction is a session roaming instruction (step S54). If the received instruction is a session roaming instruction, the unit 38 performs the session roaming procedure (step S59), and then returns to a movement detection/instruction waiting state.

Furthermore, it is determined whether the received instruction is a session release instruction (step S55). If the received instruction is a session release instruction, the unit 38 executes the session release procedure (step S60), and then returns to a movement detection/instruction waiting state.

If the received instruction is an instruction of a type other than the above four types (NO in all of steps S52 to S55), the unit 38 executes a procedure corresponding to the instruction (step S56).

The order of steps S52 to S55 may be different from that shown in FIG. 15. The type of instruction may be determined in one step, and the process may branch according to the determination result.

The operation of the display device 3-$i$ will be described below with respect to the user movement detection procedure, session setting procedure, session roaming procedure, and session release procedure.

<User Movement Procedure>

An operation example of the user movement notification unit 384 of the display device 3-$i$ for the user movement detection procedure (step S57 in FIG. 15) will be explained with reference to FIG. 16.

As described above, the display device 3-$i$ has the user detection unit 37 using, for example, close proximity wireless communication or face authentication.

Periodically detecting users using the user detection unit 37 enables to determine users present around the display device 3-$i$, and compare the users with a list of users determined in a preceding period, thereby detecting movement of the users. If the unit 37 cannot detect a user who was present in a preceding period, it can be determined that the user "left" the area near the display device 3-$i$. If the unit 37 can detect a user who was not present in a preceding period, it can be determined that the new user "entered" the area near the display device 3-$i$.

If movement of a user is detected, the process exits from step S51, and the user movement procedure (step S57 in FIG. 15) is executed.

If the user left the area (step S71), the user movement notification unit 384 transmits, to the communication server 2, a session roaming request message containing information which indicates that the user left the area, and the user ID of the user (step S72).

If the user entered the area (step S71), the user movement notification unit 384 transmits, to the communication server 2, a session roaming request message containing information which indicates that the user entered the area, and the user ID of the user (step S73).

<Session Setting Procedure>

An operation example of the session setting processing unit 381 of the display device 3-$i$ for the session setting procedure (step S58 in FIG. 15) will be explained with reference to FIG. 17.

The session setting procedure is started in the following two cases, for example.

Instruction from a user: when a user inputs a command to the display device 3-$i$ to newly start viewing a content, the procedure is started.

Instruction from the communication server 2: when the communication server 2 instructs session setting to provide a service requested by the user on the home network 10, the procedure is started.

An operation when a user inputs a command to the display device 3-$i$ to newly start viewing a content will be described first.

When a user newly starts viewing a content using the conventional terminal 4-$j$ such as the PC 4-1, cellular phone terminal 5, or LCD television set 4-2 already existing in the home, the user inputs a command to display a desired Web page using, for example, the mouse or keyboard of the PC 4-1, or inputs, to the LCD television set 4-2, a command to display a desired program using the remote control unit of the LCD television set.

Similarly, the display device 3-$i$ of this embodiment may also be configured to receive a user command. A user may input a command using a keyboard or mouse similar to that of the PC, or a remote control unit similar to that of the LCD television set. Alternatively, when the surface of the display serves as a touch screen, a user may input a command by touching the display. Furthermore, using the camera 33 used for user movement detection, the user may notify the display of his/her intention by body language such as gestures.

Upon accepting the command input by the user (step S81), the session setting processing unit 381 of the display device 3-$i$ creates a session setting request message corresponding to the command, and transmits it to the communication server 2 (step S82).

The session setting request message contains session attribute information. Details of the session attribute information are as described above.

When the session setting processing unit 381 of the display device 3-$i$ sends, as a session setting request, the session setting instruction from the user to the communication server 2, the communication control unit 38 returns to a movement detection/instruction waiting state.

An operation when the communication server 2 instructs session setting to provide a service requested by the user on the home network 10 will be explained next.

Upon receiving the session setting request created using, as a trigger, a command input operation to the display device 3-$i$ or conventional terminal of the embodiment (step S81), the communication server 2 transmits a session setting instruction message to each device on the home network 10 to instruct session setting in response to the session setting request. The session setting instruction message is sent to associated devices as a session setting instruction message. The session setting instruction message contains the session attribute information contained in the session setting request message, and the session setting processing unit 381 of the display device 3-$i$ performs necessary setting by referring to the session attribute information (step S83).

After the necessary setting processing, the session setting processing unit 381 of the display device 3-$i$ notifies the communication server 2 of end of the session setting processing, and the communication control unit 38 returns to a movement detection/instruction waiting state.

In the case of a session setting instruction, a plurality of users may simultaneously use the same display device 3-$i$. An operation in this case is the same as a resource allocation procedure in a movement destination terminal in the session roaming procedure to be described next, and a description thereof will be omitted.

<Session Roaming Procedure>

An operation example of the session roaming processing unit 382 of the display device 3-$i$ for the session roaming procedure (step S59 in FIG. 15) will be described with reference to FIG. 18.

If it is recognized that a user has moved from the moving source display device 3-$i$ to the moving destination display device 3-$j$, the session roaming processing unit 382 of the communication server 2 determines whether roaming of a content being viewed by the user to the moving destination display device 3-$j$ is performed.

If roaming is determined to be performed, the session roaming processing unit 242 of the communication server 2 transmits, to the moving source display device 3-$i$, a release request for resources associated with a session together with its session ID, and also transmits, to the moving destination display device 3-$j$, a reservation request for resources associated with a session together with its session ID.

If the user left the area of the display device 3-$i$, that is, if a resource release request message for the resources associated with the session is received (step S91), the session roaming processing unit 382 of the display device 3-$i$ executes processing of releasing the resources used by the user (step S92).

If the user entered the area of the display device 3-$j$, that is, if a resource reservation request message associated with the session is received (step S91), the session roaming processing unit 382 of the display device 3-$j$ executes processing of reserving resources to be used by the user (step S93).

The display device 3-$j$ located at the moving destination of the user may be already used by another user. In this case, it is desirable that a plurality of users share the same display device 3-$j$ or resource allocation is controlled.

This situation will be explained with reference to FIGS. 19 to 22.

The following case as shown in FIG. 19 will be described. That is, when a first user U1 is viewing a content C1 using a display device T1 in a first room R1 and a second user U2 is viewing a content C2 using a terminal T2 in a second room R2, the second user U2 moves to the display device T1 being used by the first user U1, and the communication server 2 determines that roaming of the content C2 of the second user U2 should be performed and sends a resource reservation request to the moving destination display device T1.

In this case, upon receiving a resource reservation request, the display device 3-$i$ executes the following operations.

(1) Based on the priorities of the first and second users, the device 3-$i$ determines which of the first content C1 being viewed by the first user U1 using the device 3-$i$ and the new second content C2 of the second user U2 to undergo roaming has higher priority. For example, this is the case in which, when a father comes into a living room while his child is viewing a content using a display device in the living room, it is determined whether a content being viewed by the father or the content being viewed by the child has priority over the other.

(2) It is determined which and how much resources of the display device T1 will be allocated to the first content C1 being viewed by the first user U1 and the second contents C2 being viewed by the second user U2. If, for example, a content is a broadcast content, resources to be used are a screen and an audio output. It is, therefore, determined how much of these resources will be allocated to each content. In this case, in consideration of the priority levels of the first user U1 and the second user U2, one of the following resource allocation methods is selected.

<When First User U1 and Second User U2 have Same Priority Levels>

Half the screen of the display device T1 is allocated to the first content C1, and the other half is allocated to the second content C2. The first content C1 and the second content C2 are converted into monophonic sound respectively, and then output using the two loudspeakers of the display device T1 separately. FIG. 20 shows this situation.

<When First User U1 has Priority>

The first content C1 is displayed on the whole screen (except for a very small area to be mentioned below) of the display device T1, and the second content C2 is displayed on the very small area, as a child screen, of the screen displaying the first content C1. The loudspeakers of the display device T1 reproduction the stereo sound of the first content C1, and sound reproduction is not performed for the second content C2. FIG. 21 shows this situation.

<When Second User U2 Has Priority>

The second content C2 is displayed on the whole screen of the display device T1, and the first content C1 is displayed on a small portion, as a child screen, of the screen displaying the second content C2. The loudspeakers of the display device T1 reproduction the stereo sound of the second content C2, and sound reproduction is not performed for the first content C1.

(3) According to the determined resource allocation, the first content C1 and the second content C2 are reproduced.

With respect to a sound reproduction method, for example, the stereo sound of the first content C1 and that of the second content C2 may be mixed and output. More preferably, for example, the display device 3-$i$ may have a function of using more loudspeakers, adjusting the loudspeakers and the levels and phases of stereo signals so that sound images are combined at the position of each user, and then reproducing the sound.

As shown in FIGS. 20 and 21, when the first user U1 moves from the display device T1 which is simultaneously used by the first user U1 and the second user U2, and the communication server 2 determines to perform roaming of the content of the first user U1, and then sends a resource release request to the moving source display device T1, the display device T1 receives the resource release request, and executes the following operations.

(1) The display device T1 releases the resources allocated to the content C1 of the first user U1.

(2) If it is possible to view a content as a high-quality content by adding resources, for example, if the content of the second user U2 is a high-quality image, the display device T1 reallocates the resources allocated to the content C1 of the first user U1 to the content C2 of the second user U2. Consider, for example, a case in which when the father and his child are viewing different contents on the display device in the living room, the father moves to his study room. Assume that when the father and his child are viewing different contents, half the screen of the display device and one loudspeaker are allocated to each content. Then, when the father moves to his study room, all the resources of the display device are allocated to the content being viewed by the child. Consequently, video is displayed in full screen and stereo sound is reproduced.

(3) The display device T1 continues to reproduction the second content C2 according to the determined resource allocation.

FIG. 22 shows a case in which the first user U1 moves from the first room R1 to a third room R3, and continues to view the content C1 on a display device T3.

Although movement of the two users is exemplified above, it is also possible to perform similar control processing with respect to movement of three or more users associated with the same display device. Furthermore, it is possible to use various methods of simultaneously displaying contents associated with three or more users on the same display device.

<Session Release Procedure>

With reference to FIG. 23, an operation example of the session release processing unit 383 of the display device 3-$i$ for the session release procedure (step S60 in FIG. 15) will be explained.

The operation of the display device 3-$i$ when a content being viewed by a user ends or a user terminates (stops) viewing of a content will be described.

The session release procedure is started in the following two cases, for example.

Instruction from a user: when a user inputs a command to the display device 3-$i$ to terminate (stop) viewing of a content, the procedure is started.

Instruction from the communication server 2: when the communication server 2 instructs session release to end a service requested by the user on the home network 10, the procedure is started.

An operation when a user inputs a command to the display device 3-$i$ to terminate (stop) viewing of a content will be described first.

To terminate (stop) reproduction of a content being viewed using the conventional terminal such as the PC 4-1, cellular phone terminal 5, or LCD television set 4-2 already existing in the home, a user inputs a command to terminate display of a desired Web page using, for example, the mouse or keyboard of the PC 4-1, or inputs, to the LCD television set 4-2, a command to terminate display of a desired program using the remote control unit of the LCD television set.

Similarly, the display device 3-$i$ of this embodiment may also be configured to receive a user command. A user may input a command using a keyboard or mouse similar to that of the PC, or a remote control unit similar to that of the LCD television set. Alternatively, when the surface of the display serves as a touch screen, a user may input a command by touching the display. Furthermore, using the camera 33 used for user movement detection, the user may notify the display of his/her intention by body language such as gestures.

Upon accepting the command input by the user (step S101), the session release processing unit 383 of the display device 3-$i$ creates a session release request message corresponding to the command, and sends it to the communication server 2 (step S102).

When the session release processing unit 383 of the display device 3-$i$ sends, as a session release request message, the session release instruction from the user to the communication server 2, the communication control unit 38 returns to a movement detection/instruction waiting state.

An operation when the communication server 2 instructs session release to end a service instructed by the user on the home network 10 will be explained next.

Upon receiving the session release request created using, as a trigger, a command input operation to the display device 3-$i$ or conventional terminal of the embodiment (step S101), the communication server 2 transmits a session release instruction message to each device on the home network 10 to instruct session release in response to the session release request. The session release instruction message is sent to associated devices as a session release instruction message. The session release instruction message contains session attribute information contained in the session setting request message, and the display device 3-$i$ releases resources used in a session by referring to the session attribute information (step S103).

When the resource release processing ends, the session release processing unit 383 of the display device **3-*i* notifies the communication server 2 of it, and the communication control unit 38** returns to a movement detection/instruction waiting state.

In the case of a session release instruction, a plurality of users may simultaneously be using the same display device **3-*i***. An operation in this case is the same as the resource release procedure in a movement source terminal in the session roaming procedure described above, and a description thereof will be omitted.

According to this embodiment, to accept a new user when another user is already present, resources of a display device are reallocated, and a plurality of contents are simultaneously displayed. This can avoid a situation in which a user cannot obtain information even though there is a display device at a moving destination.

In connection with the communication system of this embodiment, a method of cooperating with the cellular network 13 will be described.

As explained above, the communication server 2 of this embodiment uses the home switch 1 as a gateway for communication between inside and outside of the home. That is, a communication channel is set between the home switch 1 and a content server (not shown) on an external network, and then the home switch 1 serves as, on the home network 10, the content server (not shown) of the external network.

As a method of cooperating with the cellular network 13, a so-called femtocell is applied. As will be described below, under the control of the communication server 2 of this embodiment, the home switch 1 serves as a femtocell base station. This enables to obtain a desirable function with which it is possible to originate or accept a call using a neighboring display device **3-*i* even if the cellular phone terminal 5** is left somewhere in the home.

Figure 26:
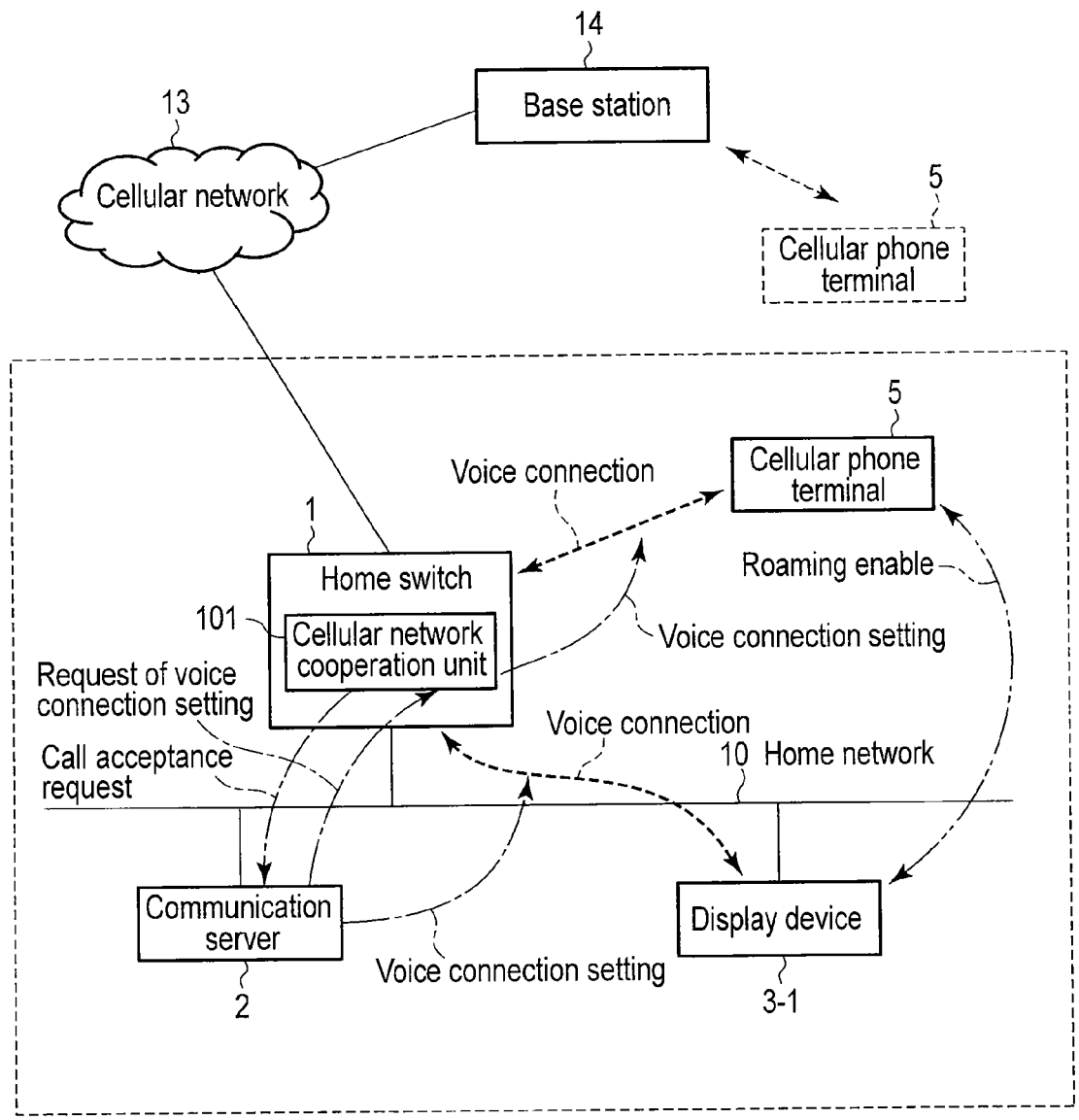
FIG. 26 is a block diagram showing still another example of the overall configuration of the communication system according to the embodiment.

Each of FIGS. 24 and 26 shows a configuration example of a portion of the communication system of this embodiment, which is necessary for the communication server 2 to cooperate with a femtocell.

As is well known, the cellular network 13 always recognizes the position of each cellular phone terminal 5, and provides a cellular phone service. This is achieved by communicating between a base station 14 and the cellular phone terminal 5. The femtocell is a technique in which a small base station is arranged in the home, and the inside of the home is considered as a small service area. The small base station arranged in the home operates like other base stations, and provides a cellular phone service inside the home. This makes it possible to use the cellular phone terminal 5 even at a location where it is difficult to receive a radio wave from a base station outside the home. In this embodiment, assume that the home switch 1 has a function of a small base station, and is provided with a wireless communication function (not shown) between a cellular network cooperation unit 101 and the cellular phone terminal 5.

When a user of the home network 10 enters the home with the cellular phone terminal 5, the home switch 1 detects it, and the cellular network cooperation unit 101 declares to the cellular network 13 that the unit 101 provides a cellular phone service for the cellular phone terminal 5 from then on. There are various methods of detecting by the home switch 1 that the cellular phone terminal 5 has entered the service area of the home switch 1, and the embodiment is not limited to a particular method. Assume, for example, that the same detection method as that for the base station 14 of the cellular network 13 is used.

Simultaneously with declaration, the cellular network cooperation unit 101 of the home switch 1 notifies the communication server 2 that the cellular phone terminal 5 has entered the service area of the home switch 1. Upon receiving the notification, the session setting processing unit 241 of the communication control unit 24 of the communication server 2 registers the cellular phone terminal 5 as a control target terminal of itself in the terminal list management unit 22. Note that the telephone number of the cellular phone terminal 5 may be sent as the terminal ID of the cellular phone terminal 5 from the cellular network cooperation unit 101.

As described above, a terminal is identified in the communication server 2 using a terminal ID determined by the user of the home network 10. The cellular phone terminal 5 is also given a terminal ID in the home. The user may set, in the terminal list management unit 22 of the communication server 2, information for associating the telephone number (an identifier given by a communication carrier) of the cellular phone terminal 5 with the terminal ID (an identifier individually given by the user) in the home.

To determine the current position of the user and use a terminal available at the current position, the terminal ID of the cellular phone terminal 5 in the home may also be associated with the user ID of the user of the cellular phone terminal 5.

Using this association, the communication server 2 determines a user who originates or accepts a call with the cellular network 13.

At this time, the communication server 2 starts to control the cellular phone terminal 5. Note that the communication server 2 need not be notified of the current position of the user at this time.

<Call Origination Processing>

Call origination processing will be described below with reference to FIGS. 24 and 25.

When a user wants to originate a call to the cellular network 13, the communication server 2 controls the home network 10 as follows.

FIG. 25 shows a call origination processing example of the communication server 2.

A user who wants to originate a call sends, by a predetermined method, a call origination command to a device which the user wants to use. A predetermined method for call origination is different for each device. For example, for the cellular phone terminal 5, a button of the cellular phone terminal 5 may be pressed. For the display device **3-*i* with the microphone 32, the user may talk "call ~" (~ denotes, for example, a name). If the user talks to input a command, however, the display device 3-*i* needs to have a speech recognition function (in this case, the display device 3-*i*** may have a well-known speech recognition function for a specific speaker). Note that there are various methods of inputting a command, and the embodiment is not limited to a particular method.

If the device selected by the user is the cellular phone terminal 5, the cellular network cooperation unit 101 of the home switch 1 originates a call according to a procedure defined by a cellular carrier, and sets a session (voice session) by a voice connection. At the same time, the unit 101 notifies the communication server 2 that the call from the cellular phone terminal 5 has been received and the voice session has been set.

The session setting processing unit 241 of the communication control unit 24 of the communication server 2 receives a call origination message (call origination notification) from the home switch 1 (step S111). If the call origination notification indicates a call from the cellular phone terminal 5 (step S112), the unit 241 recognizes that the requested voice session has started, prepares for subsequent session roaming by the session roaming processing unit 242, and registers the situation in the session attribute management unit 21 and communication resource management unit 23 (step S113).

Alternatively, if the device selected by the user is a terminal other than the cellular phone terminal 5, for example, if the device is the display device 3-*i* (step S112), in accordance with the above-described session setting procedure, the display device 3-*i* recognizes the user, notifies the communication server 2 of the user ID of the user and the position ID of the current position of the user, and instructs voice session setting (step S114).

Upon receiving the voice session setting instruction from the display device 3-*i*, the communication server 2 executes the above-described session setting procedure by considering the display device 3-*i* as a content source and the home switch 1 as a content sink.

Upon receiving the voice session setting instruction from the communication server 2, the cellular network cooperation unit 101 of the home switch 1 instructs the cellular network 13 to set the requested voice session.

Upon receiving a notification of end of the voice session setting processing for a communication partner from the cellular network 13, the cellular network cooperation unit 101 notifies the communication server 2 of it.

After that, the communication server 2 notifies the display device 3-*i* of end of the requested session setting processing.

The voice session requested by the user has been set at this time.

As described above, in this embodiment, the communication server 2 receives a call origination request, and responds to the call origination request by the same method as the above-mentioned session setting method. It is, therefore, possible to obtain preferred characteristics in session roaming, such that session roaming by the same method is possible even for sessions by different content sources, such as communication by the cellular phone terminal 5 and IP-TV viewing by a TV.

<Call Acceptance Procedure>

Call acceptance processing will be described below with reference to FIGS. 26 and 27.

Receiving a call from the cellular network 13 is processed as follows.

Figure 27:
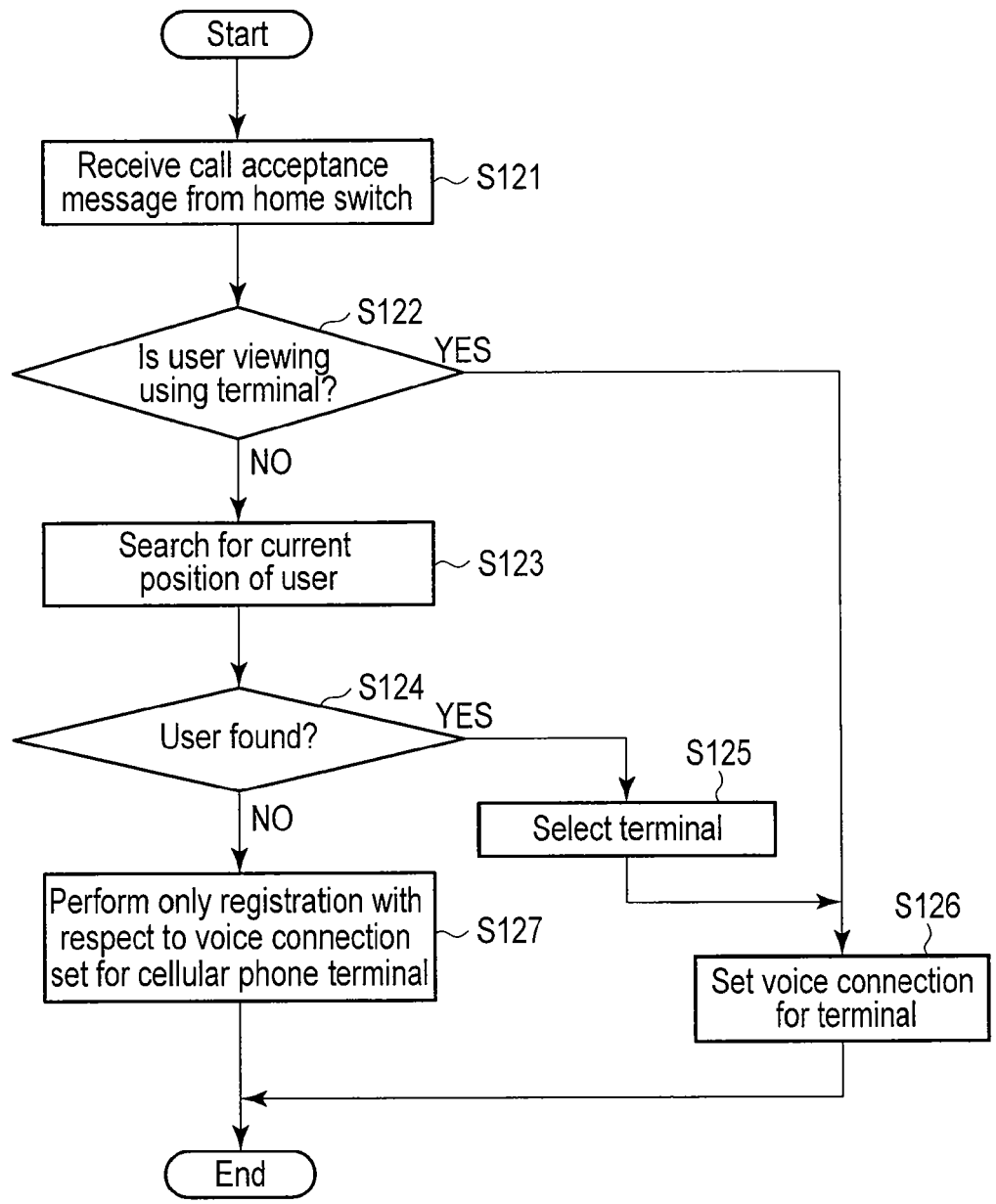
FIG. 27 is a flowchart illustrating a call acceptance processing example of the communication server.

FIG. 27 shows a call acceptance processing example of the communication server 2.

When a call is received from the cellular network 13, the cellular network cooperation unit 101 of the home switch 1 sends, to the communication server 2, a call acceptance request containing the telephone number of the cellular phone terminal 5 which is to receive the call.

The session setting processing unit 241 of the communication control unit 24 of the communication server 2 receives a call acceptance message (call acceptance request) from the home switch 1 (step S121). Upon receiving the call acceptance request, the unit 241 determines based on the contained telephone number who is to receive the call, recognizes the current position of the user (step S122), and sets a voice session to the current position (step S126).

Determination of the current position of the user and setting of the voice session may be done as follows.

When the user is viewing a content, as described above, a location where a terminal displaying the content is arranged is considered as the current position of the user, and the communication server 2 creates a list of terminals available at the current position of the user, and selects a terminal suitable for a voice call. A voice session is then set by considering the home switch 1 as a content source and the selected terminal as a content sink. After that, the session setting processing unit 241 of the communication control unit 24 of the communication server 2 recognizes that the requested voice session has started, prepares for subsequent session roaming by the session roaming processing unit 242, and registers the situation in the session attribute management unit 21 and communication resource management unit 23.

Alternatively, if the user is not viewing a content (step S122), a user search is requested to all the display devices 3-*i* connected to the home network 10 (step S123).

For example, each display device 3-*i* may search for the user as follows. That is, a radio wave is received for a predetermined period of time to determine whether a beacon signal sent from the presence sensor 7 of the user can be received, and/or the video of the camera 33 is checked to determine whether the user is in the video.

When a display device 3-*i* finds the user, it notifies the communication server 2 of the user ID of the user and the position ID of the current position of the user.

If the user is found near terminals (step S124), the communication server 2 creates a list of the terminals available at the current position indicated by the sent position ID, and selects a terminal suitable for a voice call (step S125). After that, a voice session is set by considering the home switch 1 as a content source and the selected terminal as a content sink (step S126). When the voice session setting processing ends, the session setting processing unit 241 of the communication control unit 24 of the communication server 2 recognizes that the requested voice session has started, prepares for subsequent session roaming by the session roaming processing unit 242, and registers the situation in the session attribute management unit 21 and communication resource management unit 23.

If a beacon signal is not received within the predetermined period of time, or If the user cannot be found in the video of the camera 33, the user search is determined to have failed, and the display device 3-*i* notifies the communication server 2 of it.

Upon receiving failure notifications from all the display devices 3-*i* which have received the search request (step S124), the communication server 2 determines that the user search has failed. In this case, the communication server 2 may request the cellular network cooperation unit 101 of the home switch 1 to guide the call to the cellular phone terminal 5 (step S127).

Upon receiving a request of call acceptance of the cellular phone terminal 5 from the communication server 2, the cellular network cooperation unit 101 receives the call in accordance with a procedure defined by a cellular carrier, and sets a voice session. At the same time, the unit 101 notifies the communication server 2 that the call for the cellular phone terminal 5 has been received and the voice session has been set.

The communication control unit 24 of the communication server 2 recognizes that the requested voice session has started, prepares for subsequent session roaming by the session roaming processing unit 242, and registers the situation in the session attribute management unit 21 and communication resource management unit 23.

Since the communication server 2 of this embodiment operates as described above, it is possible to select, based on the state of the user, to receive the call by the cellular phone terminal 5 or another device on the home network 10. Using the user position determination function/user recognition function of the display device 3-*i* enables the mother to, for example, receive a call using the display device 3-*i* hands free while she prepares a meal.

In the above description, the communication server 2 preferentially attempts to cause another device to receive a call, and if this is impossible, the communication server 2 causes the cellular phone terminal 5 to receive the call. The communication server 2, however, may preferentially attempt to cause the cellular phone terminal 5 to receive a call, and if this is impossible (for example, when the cellular phone terminal 5 is off), the communication server 2 may cause another device to receive the call. Alternatively, each user may select and set to preferentially receive a call using the cellular phone terminal 5 or another device, as needed. For example, the communication server 2 holds/manages this setting.

FIG. 27 shows a call acceptance processing example of the communication server 2 when the cellular phone terminal 5 preferentially receives a call.

If a call is originated or accepted as described above, communication using the cellular network 13 can be managed by session management by the communication server 2. Furthermore, it is possible to perform session roaming by the session roaming processing unit 242 and session release by the session release processing unit 243 on the home network 10 using the above-described method.

Unlike the display device 3-*i*, LCD television set 4-2, and PC 4-1, the cellular phone terminal 5 may be carried by the user in the home, and its current position may always change in the home. Since the service area of the femtocell covers the whole home, position determination of the cellular phone terminal 5 by the home switch 1 has granularity such that only whether the cellular phone terminal 5 is present in the home is determined, and it is impossible to determine where in the home the cellular phone terminal 5 is present. Furthermore, since the user does not always carry the cellular phone terminal 5 in the home, it is impossible to always determine the current position of the cellular phone terminal 5.

Since session roaming according to this embodiment is performed by associating the arrangement position of a terminal with the current position of a user, it is necessary to recognize the current position of the cellular phone terminal 5.

Assume that a user is making voice communication using the cellular phone terminal 5. When the user wants to continue the voice communication using another terminal such as the display device 3-*i*, the arrangement position of the display device 3-*i* as a roaming destination is to be the current position of the user. Furthermore, since the user is using the cellular phone terminal at this time, the current position of the user is also that of the cellular phone terminal 5 as a roaming source. In this case, the current position of the cellular phone terminal 5 can be estimated from the current position of the user, and roaming from the cellular phone terminal 5 to the display device 3-*i* is performed by selecting a terminal suitable for voice communication from terminals selected according to the current position of the user. Roaming may be triggered when the user sends an instruction to a terminal which the user wants to use by inputting a command.

Assume that a user is making voice communication using another terminal such as the display device 3-*i*. When the user wants to continue the voice communication using the cellular phone terminal 5, the following procedure is performed. In this case, although the arrangement position of the display device 3-*i* as a roaming source is the current position of the user, the current position of the cellular phone terminal 5 as a roaming destination does not always coincide with that of the user (that is, the user does not always carry the cellular phone terminal 5). When, however, the user wants to change a terminal to use from the display device 3-*i* to the cellular phone terminal 5, the user should be carrying the cellular phone terminal 5, and should be able to present the cellular phone terminal 5 within the visual field of the camera 33 of the display device 3-*i*. Presenting the cellular phone terminal 5 within the visual field of the camera 33 of the display device 3-*i* when the user is making a voice call using the display device 3-*i* may be considered as a command to instruct roaming to the cellular phone terminal 5.

For example, the same goes with roaming of a voice call from one display device 3-*i* to another display device 3-*i*.

As described above, according to this embodiment, it is possible to control an information device arranged near a user so that the user can acquire or view desired information or a desired content at a moving destination.

It is also possible to create a list of information terminals available at the position of the user, and present desired information to the user by selecting an information terminal from the created list. The user in motion can acquire information using a display device arranged at a moving destination.

A display device arranged at a moving destination which is not assumed to be carried can be expected to have sufficient resources like a PC, thereby largely relaxing restrictions on the amount of information obtained during movement.

Furthermore, not the identifier of a device but an identifier indicating a user is used in movement management, and movement of a user is followed in session setting/roaming. This can implement a preferred function using a terminal which is expected to have sufficient resources, as in a PC. For example, it is possible to appropriately handle movement of a user detected using a presence sensor or the user recognition function of a display device, and to continue to display a content being viewed on an available device determined based on the current position of the user or receive a call at the current position of the user from outside.

According to this embodiment, it is possible to control one information device such as a general PC, television set, or display device to be shared by a plurality of users near the information device so that they can simultaneously acquire or view different pieces of information or contents.

Even if, for example, another user using a display device located at a moving destination of a user is already present, it is possible to display, on the display device already used, a content for the user who has moved, because resources are allocated to both a newly set session and an already existing session. Consequently, it is possible to avoid a situation that a content cannot be obtained because a display device at a moving destination is already used.

Furthermore, a plurality of users near the arrangement position of a display device can share the display device. When a user in motion obtains information using the display device arranged at a moving destination, the user can obtain the information even if another user is present nearby.

Note that, the respective modules or functions described above may be implemented in hardware, firmware, software, or any combination thereof.

The flow charts of the embodiments illustrate methods and systems according to the embodiments of the invention. Each block of the flowchart illustrations, and combinations of blocks in the flowchart illustrations may be implemented in hardware, firmware, software, or any combination thereof.

When implemented in software, it will be understood that each block of the flowchart illustrations, and combinations of blocks in the flowchart illustrations, may be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication server, comprising:
   a communication interface unit configured to connect to a network;
   a first storage unit configured to store terminal list information containing a terminal identifier for identifying a terminal and a position identifier for identifying a position of the terminal for each terminal, wherein the terminal is connected to the network and is capable of presenting a content including at least one of audio data and image data;
   a session setting processing unit configured to transmit, upon receiving a first message from the terminal, an instruction to set a session for presenting the content on the terminal to one or a plurality of terminals associated with the session, wherein the first message contains user identifier for identifying a user associated with the session, user position identifier for specifying a current position of the user, and content information about the content associated with the session;
   a second storage unit configured to store session attribute information containing the user identifier, the user position identifier and the content information associated with the session; and
   a session roaming processing unit configured to select, when a second message containing the user identifier and the user position identifier of the user is received via the network while the session is maintained after the session is set, and it is then determined based on the second message that the user moved, a terminal having a position identifier corresponding to the user position identifier after the user moved based on the terminal list information, and to transmit, to a plurality of devices associated with session roaming to the selected terminal, an instruction to perform the session roaming.

2. The communication server according to claim 1, wherein the terminal list information also contains information about performance of each terminal, and wherein when there are a plurality of selectable terminals, the session roaming processing unit selects a terminal based on the terminal list information and the information about the content of the session attribute information.

3. The communication server according to claim 2, wherein when a home switch, on the network, having a femtocell base station unit of an external cellular network notifies the session setting processing unit that a cellular phone terminal in a service area of the base station unit originated a call, the session setting processing unit recognizes that a voice session for the cellular phone terminal has been set.

4. The communication server according to claim 3, wherein when a home switch, on the network, having a femtocell base station unit of an external cellular network notifies the session setting processing unit that a cellular phone terminal in a service area of the base station unit accepted a call, and it is possible to find a terminal having a position identifier the same as a position identifier of a current position of a user associated with the cellular phone terminal, the session setting processing unit sets a voice session for the terminal.

5. The communication server according to claim 4, wherein if it is impossible to find a terminal having a position identifier the same as a position identifier of a current position of a user associated with the cellular phone terminal, the session setting processing unit requests the home switch to set a voice session for the cellular phone terminal.

6. The communication server according to claim 5, wherein upon receiving an instruction of session roaming from the cellular phone terminal to a specific terminal other than the cellular phone terminal, the session roaming processing unit performs session roaming from the cellular phone terminal to the specific terminal.

7. The communication server according to claim 6, wherein the terminal other than the cellular phone terminal is a display device which is capable of performing voice communication and has a camera, and
   wherein when the display device detects that a cellular phone terminal is presented within a visual field of the camera, the session setting processing unit sets a voice session for the display device.

8. The communication server according to claim 7, wherein the second message is transmitted from a terminal which is capable of presenting the content.

9. A session control method for a communication server including a communication interface unit which connects to a network, and a first storage unit which stores terminal list information containing a terminal identifier for identifying a terminal and a position identifier for identifying a position of the terminal for each terminal, wherein the terminal is connected to the network and is capable of presenting a content including at least one of audio data and image data, the method comprising:
   transmitting, upon receiving a first message from the terminal, an instruction to set a session for presenting the content including the at least one of the audio data and the image data on the terminal to one or a plurality of terminals associated with the session, wherein the first message contains user identifier for identifying a user associated with the session, user position identifier for specifying a current position of the user, and content information about the content associated with the session;
   storing session attribute information containing the user identifier, the user position identifier and the content information associated with the session; and
   when a second message containing the user identifier and the user position identifier of the user is received via the network while the session is maintained after the session is set, and it is then determined based on the second message that the user moved, selecting a terminal having a position identifier corresponding to the user position identifier after the user moved based on the terminal list information, and transmitting, to a plurality of devices associated with session roaming to the selected terminal, an instruction to perform the session roaming.

* * * * *